US012792825B2

(12) United States Patent
Xiong et al.

(10) Patent No.: US 12,792,825 B2
(45) Date of Patent: Nov. 10, 2026

(54) FORM PROCESSING METHOD AND APPARATUS, DEVICE, AND STORAGE MEDIUM

(71) Applicant: Tencent Technology (Shenzhen) Company Limited, Shenzhen (CN)

(72) Inventors: Fei Xiong, Shenzhen (CN); Ye Tian, Shenzhen (CN); Qiaoyun Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 839 days.

(21) Appl. No.: 18/132,688

(22) Filed: Apr. 10, 2023

(65) Prior Publication Data

US 2023/0244862 A1 Aug. 3, 2023

Related U.S. Application Data

(63) Continuation of application No. PCT/CN2022/093422, filed on May 18, 2022.

(30) Foreign Application Priority Data

Jun. 25, 2021 (CN) ........................ 202110713799.9

(51) Int. Cl.
*G06F 40/174* (2020.01)
*G05D 101/10* (2024.01)
(Continued)

(52) U.S. Cl.
CPC .......... *G06F 40/174* (2020.01); *G06F 3/0482* (2013.01); *G05D 2101/10* (2024.01);
(Continued)

(58) Field of Classification Search
CPC .. G06F 16/3347; G06F 40/174; G06F 3/0482; G06F 2203/04803; G06F 40/18;
(Continued)

(56) References Cited

U.S. PATENT DOCUMENTS

| | | | | |
|---|---|---|---|---|
| 11,763,919 B1 * | 9/2023 | Jain | ........................ | G16H 10/20 715/221 |
| 2016/0217119 A1 * | 7/2016 | Dakin | ................... | G06F 40/274 |
| 2021/0342375 A1 * | 11/2021 | Pei | ........................ | G06F 16/353 |

FOREIGN PATENT DOCUMENTS

| | | | |
|---|---|---|---|
| CN | 112528207 A | 3/2021 | |
| CN | 112596816 A * | 4/2021 | ......... G06F 9/44526 |
| CN | 113407696 A | 9/2021 | |

OTHER PUBLICATIONS

International Search Report issued Aug. 17, 2022 in Application No. PCT/CN2022/093422 (5 pages).

* cited by examiner

*Primary Examiner* — Quoc A Tran
(74) *Attorney, Agent, or Firm* — ARENT FOX SCHIFF LLP

(57) ABSTRACT

Some aspects of the disclosure provide a method of form processing. The method includes displaying, by a computer device and in response to a form creation request, a form creation interface comprising a subject input region, and displaying, by the computer device and in response to an input operation on the subject input region, form subject information that is input via in the subject input region. The method also includes displaying a candidate material list with one or more form materials in the form creation interface according to the form subject information, the one or more form materials in the candidate material list are associated with the form subject information. Further, the method includes obtaining, by the computer device and in
(Continued)

response to a selection operation on a target form material in the candidate material list, a target form according to the target form material and the form subject information.

20 Claims, 17 Drawing Sheets

(51) Int. Cl.

| | |
|---|---|
| ***G06F 3/0482*** | (2013.01) |
| ***G06F 3/0484*** | (2022.01) |
| ***G06F 16/332*** | (2025.01) |
| ***G06F 16/3329*** | (2025.01) |
| ***G06F 16/334*** | (2025.01) |
| ***G06F 16/338*** | (2019.01) |
| ***G06F 40/18*** | (2020.01) |
| ***G06F 40/186*** | (2020.01) |
| ***G06F 40/279*** | (2020.01) |
| ***G06F 40/30*** | (2020.01) |
| ***G06N 3/08*** | (2023.01) |
| ***G06N 5/022*** | (2023.01) |

(52) U.S. Cl.
CPC .......... *G06F 3/0484* (2013.01); *G06F 16/332* (2019.01); *G06F 16/3329* (2019.01); *G06F 16/3347* (2019.01); *G06F 16/338* (2019.01); *G06F 40/18* (2020.01); *G06F 40/186* (2020.01); *G06F 40/279* (2020.01); *G06F 40/30* (2020.01); *G06F 2203/04803* (2013.01); *G06N 3/08* (2013.01); *G06N 5/022* (2013.01)

(58) Field of Classification Search
CPC ...... G06F 40/279; G06F 40/186; G06F 40/30; G06F 16/3329; G06F 16/338; G06F 16/332; G06F 3/0484; G06N 5/022; G06N 3/08; G05D 2101/10
See application file for complete search history.

FORM PROCESSING METHOD AND APPARATUS, DEVICE, AND STORAGE MEDIUM

RELATED APPLICATIONS

The present application is a continuation of International Application No. PCT/CN2022/093422, entitled "FORM PROCESSING METHOD AND APPARATUS, DEVICE, AND STORAGE MEDIUM" and filed on May 18, 2022, which claims priority to Chinese Patent Application No. 202110713799.9, entitled "COLLECTION FORM PROCESSING METHOD AND APPARATUS, DEVICE, AND STORAGE MEDIUM" and filed on Jun. 25, 2021. The entire disclosures of the prior applications are hereby incorporated by reference in their entirety.

FIELD OF THE TECHNOLOGY

This application relates to the field of computer vision and natural language processing technologies in artificial intelligence, including form processing.

BACKGROUND OF THE DISCLOSURE

With development of an Internet technology, analyzing user needs by collecting information is gradually popularized in people's daily life. For example, a merchant may survey needs, satisfactions, or the like of customers through a questionnaire. At present, an information collector needs to manually edit a collection form material (for example, a question and a subject image) to create a collection form, send the collection form to a completer to enable the completer to fill out the collection form, and collect and statistically organize a fill-out result of each completer, thereby obtaining information that needs to be collected.

SUMMARY

Embodiments of this disclosure provide a form processing method and apparatus, a device, and a storage medium, which can improve efficiency and convenience in form creation while reducing occupation of a processing resource of a computer device.

Some aspects of the disclosure provide a method of form processing. The method includes displaying, by a computer device and in response to a form creation request, a form creation interface comprising a subject input region, and displaying, by the computer device and in response to an input operation on the subject input region, form subject information that is input via in the subject input region. The method also includes displaying a candidate material list with one or more form materials in the form creation interface according to the form subject information, the one or more form materials in the candidate material list are associated with the form subject information. Further, the method includes obtaining, by the computer device and in response to a selection operation on a target form material in the candidate material list, a target form according to the target form material and the form subject information.

Some aspects of the disclosure provide an apparatus for form processing, the apparatus includes processing circuitry configured to display, in response to a form creation request, a form creation interface comprising a subject input region and display, in response to an input operation on the subject input region, form subject information that is input via in the subject input region. The processing circuitry is also configured to display a candidate material list with one or more form materials in the form creation interface according to the form subject information, the one or more form materials in the candidate material list are associated with the form subject information. The processing circuitry is further configured to obtain, in response to a selection operation on a target form material in the candidate material list, a target form according to the target form material and the form subject information.

An embodiment of this disclosure also provides a computer program product. The computer program product includes computer instructions. The computer instructions are stored in a computer-readable storage medium (e.g., non-transitory computer-readable storage medium). The computer instructions are executed to implement the form processing method.

DESCRIPTION OF EMBODIMENTS

Figure 1:
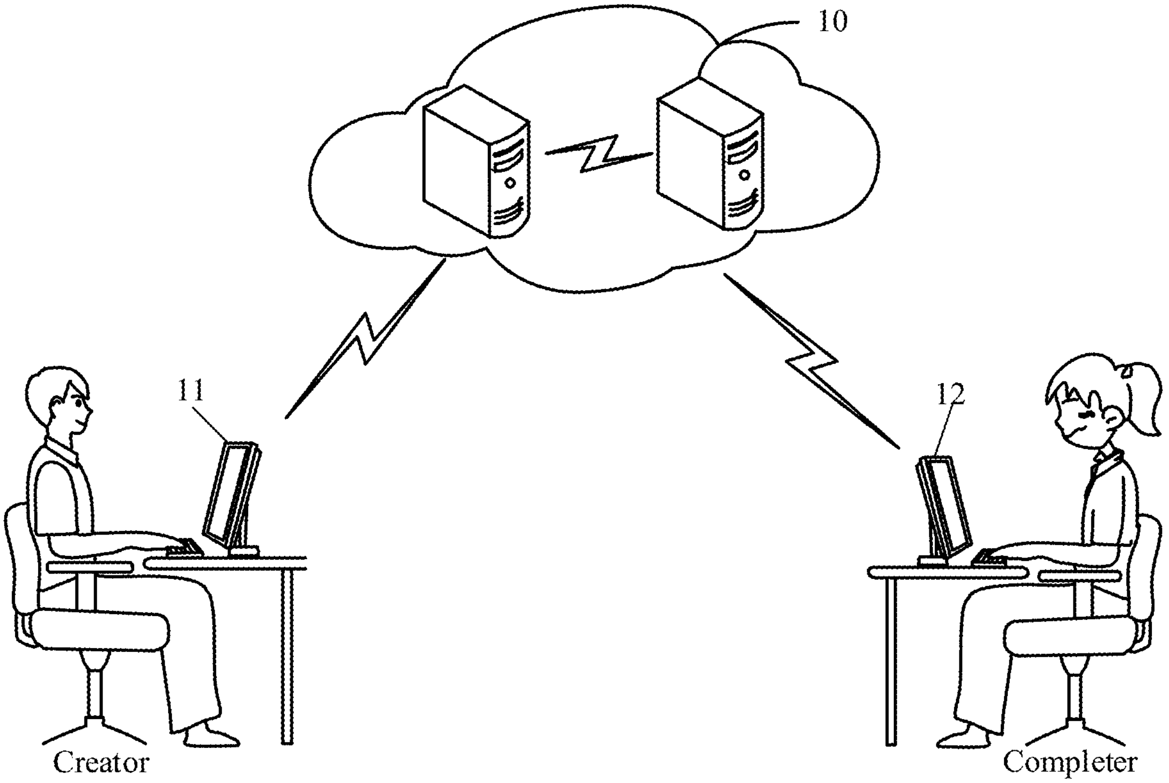
FIG. 1 is a schematic architectural diagram of a form processing system according to an embodiment of this disclosure.

The technical solutions in the embodiments of this disclosure will be described below in combination with the drawings in the embodiments of this disclosure. The described embodiments are not all but only some embodiments of this disclosure.

In many application scenarios, users often need to create collection forms, for example, a questionnaire scenario, a voting statistics scenario, or an information collection scenario. Typically, a user needs to create a form including a plurality of questions.

In some embodiments, the form may be a collection form, or referred to as a questionnaire form. The collection form is a form or text that may be used for collecting information. Specifically, the collection form may include one or more questions. Therefore, after a user (that is, a completer who fills out the collection form) fills out or selects one or more questions in the collection form, relevant information about the completer may be collected by collecting the completed collection form. For example, in a freshman enrollment scenario, a collection form may be made to collect basic information about freshmen. Collecting information through a collection form improves information collection efficiency to some extent.

In the embodiments of this disclosure, when a creator needs to create a form, a computer device may display, in response to a form creation request, a form creation interface including a subject input region, and may further display form subject information input by the creator in the subject input region, and display a candidate material list a candidate material list in the form creation interface according to the form subject information. The creator may select one or more form materials from the candidate material list. Accordingly, the computer device determines the form material selected by the creator as a target form material. The target form material may be one of a subject image, question information, a subject image as well as question information, or the like. A target form is obtained according to the form subject information and the target form material. It can be seen that in a form creation process, displaying the candidate material list in the form creation interface helps the creator select the form material from the candidate material list to create the form, and avoids manual editing of the form material and frequent jumping from the form creation interface to another interface for obtaining the form material. This improves efficiency and convenience in form creation while reducing frequent jumping operations of the computer device between different interfaces and a large quantity of search operations on the form material according to an input of the user, thereby reducing occupation of a processing resource of the computer device. In addition, associating the form material in the candidate material list with the form subject information helps the creator quickly select a proper form material to improve form material obtaining efficiency, and can further reduce the quantity of search operations performed by the computer device, thereby improving processing efficiency of the computer device.

The solution provided in the embodiments of this disclosure relates to a computer vision technology, a natural language processing technology, and the like in artificial intelligence. For example, the subject image associated with the form subject information is recognized by using the computer vision technology, and the question information associated with the form subject information is recognized by using the natural language processing technology. Further, the subject image and the question information are added to the candidate material list in the form creation interface as form materials, and the user may perform a selection operation on the candidate material list to create the target form. It can be seen that, in this disclosure, the user may create the form only by performing a simple selection operation on the form material in the candidate material list in the form creation interface, without editing the question information in the form one by one and selecting the subject image by jumping from the form creation interface to the outside, so that the efficiency and convenience in form creation are improved.

For ease of understanding this disclosure more clearly, a form processing system for implementing a form processing method of this disclosure is described first. As shown in FIG. 1, the form processing system includes a server 10, a terminal 11, and a terminal 12.

A form may be a collection form for collecting information. The following uses the collection form as an example for description. The server 10 may be a back-end device configured to provide an information collection service. For example, the server 10 may provide an information collection platform for a user. The information collection platform may be an information collection application program (for example, a document application program), an information collection web page, an information collection applet, or the like. The information collection platform allows the user to create an information collection form, fill out the information collection form, download the information collection form, share the information collection table, and the like. The collection information is specifically a document for collecting information and converting a collection result into a form.

It may be understood that the collection form may include collection form subject information and a collection form material. The collection form subject information is used for reflecting main information that needs to be collected through the collection form. The collection form subject information may also be referred to as a name of the collection form. For example, if the name of the collection form is illustration activity registration form, the collection form subject information of the collection form may be illustration activity registration form. The collection form material is a material pre-collected for creating the collection form, and may include one or more of question related information and a subject image. The question related information includes question information, a to-be-selected answer of the question information, an answer display mode, a question type, and the like. The subject image may be an envelope image of the collection form.

It may be understood that the answer display mode may include a direct display mode (e.g., display with visibility) and a hiding display mode (e.g., display with hidden visibility). The direct display mode refers to directly displaying the to-be-selected answer of the question information in an answer editing region of the question information. The hiding display mode refers to displaying, in hiding, the to-be-selected answer of the question information in a pull-down menu of the answer editing region of the question information. The question type includes an answer selection type and a question-answer type. The answer selection type refers to that the collection form includes a plurality of to-be-selected answers of the question information, and the user may select one or more of the plurality of to-be-selected answers as answers of the question information. The question-answer type refers to that the collection form does not include the to-be-selected answer of the question information, and the user may manually input the answer of the question information.

Both the terminal 11 and the terminal 12 may be configured to create the collection form in a collection form creation interface of the information collection platform, or may be configured to collect information based on the collection form. For example, the terminal 11 may be a device used by a creator to create the collection form in the collection form creation interface of the information collection platform, and the terminal 12 may be a device used by an information completer to edit information in the collection form.

It may be understood that the terminal may be a device with a collection form creation capability, a human-computer interaction capability, and a communication capability. The terminal may be but is not limited to a smartphone, a tablet computer, a notebook computer, a desktop computer, a smart speaker, a smart watch, or the like. The server may be an independent physical server, or a server cluster or distributed system including a plurality of physical servers, or a cloud server providing a basic cloud computing service such as a cloud service, a cloud database, cloud computing, a cloud function, cloud storage, a network service, cloud communication, a middleware service, a domain name service, a security service, a content delivery network (CDN), and a big data and artificial intelligence platform. Each user terminal may be directly or indirectly connected to each server through wired or wireless communication. This is not limited herein in this disclosure.

It may be understood that the collection form creation interface may include a collection form display region and a candidate material display region. The collection form display region is a region for displaying the collection form. The candidate material display region may be a region for displaying a candidate material. A region parameter of the collection form display region may be the same as or different from that of the candidate material display region. The region parameter includes a size, a shape, or another parameter of the region. The collection form display region and the candidate material display region may be arranged in rows, in columns, or in another manner. This is not limited in this disclosure. It may be understood that positions of the candidate material display region and the collection form display region in the collection form creation interface, a size of the collection form display region, and the size of the candidate material display region are all allowed to be adjusted. For example, the creator may change the position of the candidate material display region in the collection form creation interface according to a personal preference, and the position of the collection form display region in the collection form creation interface may be adjusted according to the position of the candidate material display region.

Figure 2:
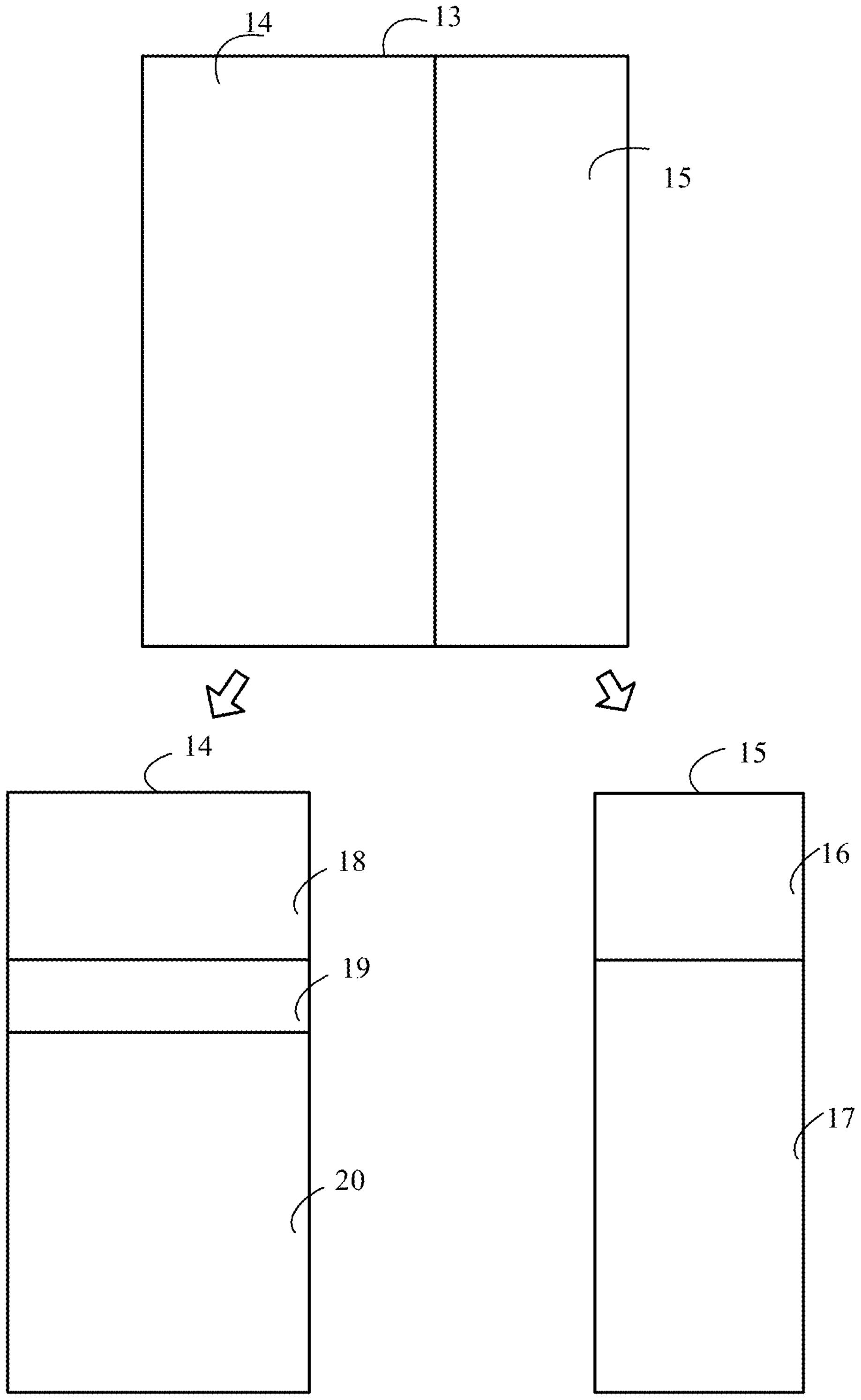
FIG. 2 is a schematic diagram of a form creation interface according to an embodiment of this disclosure.

For example, FIG. 2 shows a collection form creation interface 13. The collection form creation interface 13 may include a collection form display region 14 and a candidate material display region 15. The collection form display region 14 and the candidate material display region 15 are displayed in the collection form creation interface 13 in columns. A size of the collection form display region 14 is larger than that of the candidate material display region 15. Both the collection form display region 14 and the candidate material display region 15 are rectangular in shape.

It may be understood that the candidate material display region may include at least one of an image display subregion and a question information display subregion. The image display subregion is used for displaying a candidate subject image. The question information display subregion is used for displaying candidate question information, a question type corresponding to the candidate question information, an answer display mode, a to-be-selected answer, and the like. When the candidate material display region includes the image display subregion and the question information display subregion, a region parameter of the image display subregion may be the same as or different from that of the question information display subregion. The image display subregion and the question information display subregion may be arranged in rows, in columns, or in another manner. This is not limited in this disclosure.

For example, FIG. 2 shows the candidate material display region 15. The candidate material display region 15 includes an image display subregion 16 and a question information display subregion 17. The image display subregion 16 and the question information display subregion 17 are arranged in the candidate material display region 15 in columns. A size of the image display subregion 16 is smaller than that of the question information display subregion 17.

It may be understood that the collection form display region may include a subject input region, a subject image display region, and a question information display region. The subject input region is used for displaying the collection form subject information of the collection form. The subject image display region is used for displaying the subject image of the collection form. The question information display region is used for displaying the question information, answer information, and the like of the collection form. Each of the subject input region, the subject image display region, and the question information display region may have the same or different region parameters. The subject input region, the subject image display region, and the question information display region may be arranged in rows, in columns, or in another manner. This is not limited in this disclosure.

For example, FIG. 2 shows the collection form display region 14. The collection form display region 14 includes a subject image display region 18, a subject input region 19, and a question information display region 20. The subject image display region 18, the subject input region 19, and the question information display region 20 are arranged in the collection form display region 14 in rows. An area of the question information display region 20 is largest, an area of the subject input region 19 is smallest, and an area of the subject image display region 18 is between the area of the question information display region 20 and the area of the subject input region 19.

Figure 3A:
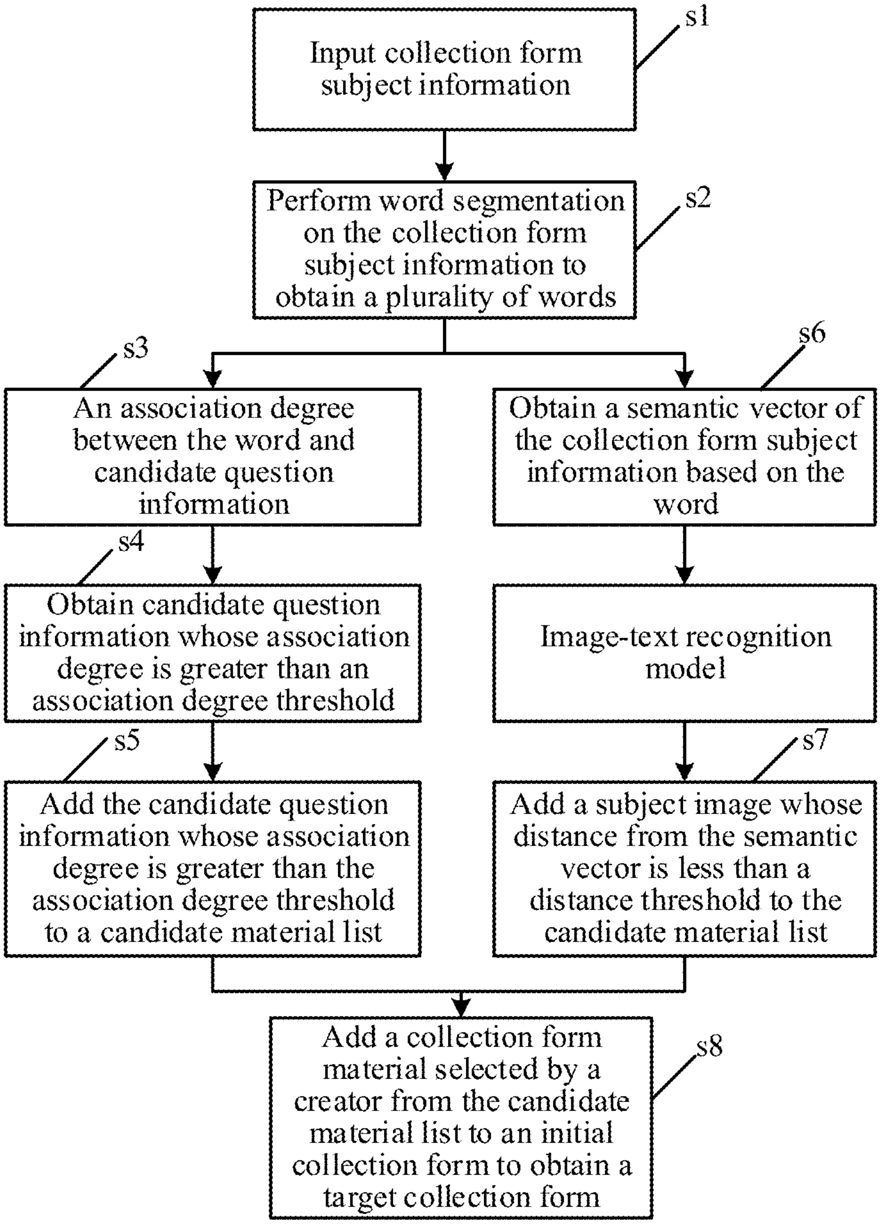
FIG. 3*a* is a schematic diagram of a scenario in which data interaction is performed between each device in a form processing system according to an embodiment of this disclosure.
Figure 3B:
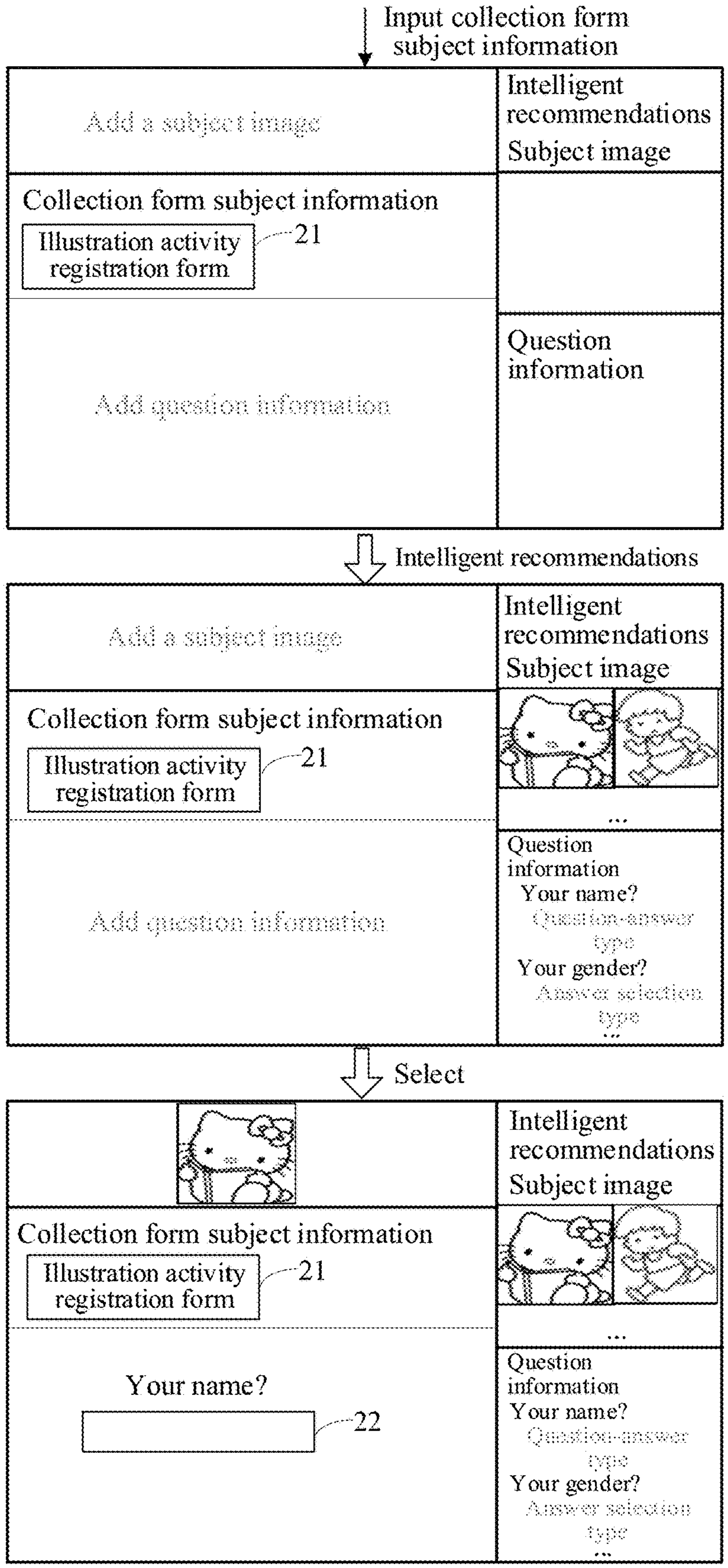
FIG. 3*b* is a schematic diagram of a scenario in which a form is created according to an embodiment of this disclosure.

For ease of understanding, further, FIG. 3*a* to FIG. 3*b* are schematic diagrams of a data interaction scenario according to an embodiment of this disclosure. FIG. 3*a* to FIG. 3*b* are described by using an example in which a creator creates an illustration activity registration form. As shown in FIG. 3*a*, a creation process of the illustration activity registration form may include the following steps s1 to s8.

In step s1, the terminal 11 obtains collection form subject information input by the creator.

In step s2, the server 10 performs word segmentation on the collection form subject information to obtain a plurality of words.

In step s3, the server 10 obtains an association degree between candidate question information and the word.

In step s4, the server 10 obtains candidate question information whose association degree is greater than an association degree threshold.

In step s5, the server 10 adds the candidate question information whose association degree is greater than the association degree threshold to a candidate material list.

In step s6, the server 10 obtains a semantic vector of the collection form subject information.

In step s7, the server 10 obtains a subject image that matches the semantic vector of the collection form subject information, and adds the subject image that matches the semantic vector of the collection form subject information to the candidate material list.

In step s8, the terminal 11 adds a collection form material selected by the creator from the candidate material list to an initial collection form to obtain a target collection form.

In steps s1 to s8, referring to FIG. 3*b* together, a collection form creation interface may include a collection form creation option, and the creator may perform a touch operation on the collection form creation option. Accordingly, the terminal 11 may output, in response to the touch operation on the collection form creation option, a collection form creation interface including a subject input region. As shown in FIG. 3*b*, the subject input region includes a subject input box 21. The terminal 11 may obtain the collection form subject information input by the creator in the subject input box 21 of the subject input region, and display the collection form subject information in the subject input region. That is, the collection form subject information is illustration activity registration form.

After the terminal 11 obtains the collection form subject information, the terminal 11 may send the collection form subject information to the server 10, and the server 10 may recommend question information to the creator based on the collection form subject information. Specifically, the server 10 may perform word segmentation on the collection form subject information to obtain the plurality of words. For example, the plurality of words include illustration, activity registration, and form. The server may extract a keyword in the plurality of words. For example, the keyword includes illustration and activity registration. The server 10 may obtain a historical collection form including the keyword in historical collection form subject information, determine question information in the historical collection form as the candidate question information, collect statistics on a quantity of times of appearance of the candidate question information in the historical collection form, and determine an association degree between the collection form subject information and the candidate question information according to the quantity of times of appearance of the candidate question information in the historical collection form. Further, the candidate question information whose association degree is greater than the association degree threshold may be determined as question information associated with the collection form subject information, and the question information associated with the collection form subject information is added to the candidate material list.

The server 10 may perform semantic extraction on the plurality of words to obtain the semantic vector of the collection form subject information, and input the semantic vector of the collection form subject information to an image-text recognition model. The image-text recognition model recognizes the semantic vector of the collection form subject information, and outputs a subject image whose distance from the semantic vector of the collection form subject information is less than a distance threshold. The output subject image is determined as a subject image associated with the collection form subject information. The subject image associated with the collection form subject information is added to the candidate material list.

The server 10 may send the candidate material list including subject image and the question information that are associated with the collection form subject information to the terminal 11. The terminal 11 displays the candidate material list in the collection form creation interface. The creator may select a collection form material from the candidate material list, and determine the selected collection form material as a target collection form material. The target collection form material includes one or more of the question information and the subject image. A target collection form is obtained based on the target collection form material and the collection form subject information.

As shown in FIG. 3*b*, question information associated with illustration activity registration form includes: "Your name?", "Your gender?", or the like. That is, the candidate material list includes "Your name?" and "Your gender?". The candidate material list further displays a question type of the question information. For example, a question type of "Your name" is a question-answer type, and a question type of "Your gender" is an answer selection type. FIG. 3*b* shows the subject image associated with illustration activity registration form. The question information associated with illustration activity registration form is displayed in a question information display subregion in a candidate material display region. The subject image associated with illustration activity registration form is displayed in an image display subregion in the candidate material display region. The creator may perform a selection operation on a first image in the image display subregion. Accordingly, the terminal 11 may add the first image to a subject image display region in the collection form creation interface. The creator may perform a selection operation on "Your name?" in the question information display subregion. Accordingly, the terminal 11 may display "Your name?" in a question information region in the collection creation interface, and display an answer input box 22 of "Your name?" to obtain the target collection form. The answer input box 22 allows input of an answer of "Your name?".

Further, FIG. 4 is a schematic flowchart of a form processing method according to an embodiment of this disclosure. As shown in FIG. 4, the method may be performed by a computer device. The computer device may be any terminal in FIG. 1, or may be the server in FIG. 1. The method may include at least the following S101 to S103.

In step S101, in response to a form creation request, a form creation interface including a subject input region is displayed.

In this disclosure, the form creation interface may include a form creation option. A user may perform a touch operation on the form creation option. Accordingly, it is determined, in response to detecting the touch operation on the form creation option, that the form creation request is received. The form creation interface including the subject input region is displayed in response to the creation request. The subject input region allows input of form subject information.

In step S102, in response to an input operation on the subject input region, input form subject information in the subject input region is displayed, and a candidate material list in the form creation interface is displayed according to the form subject information, a form material in the candidate material list is associated with the form subject information.

In this disclosure, a creator may input the form subject information in the subject input region. Accordingly, the computer device may display the input form subject information in the subject input region in response to the input operation on the subject input region, and display the candidate material list in a candidate material display region of the form creation interface according to the form subject information. The candidate material list includes a candidate subject image, to-be-selected question information, and the like. The candidate subject image in the candidate material list may be displayed in an image display subregion. The to-be-selected question information in the candidate material list may be displayed in a question information display subregion. Displaying the candidate material list in the form creation interface helps the creator select the form material from the candidate material list to create a form, and avoids manual editing of the form material and frequent jumping from the form creation interface to another interface for obtaining the form material. This improves efficiency and convenience in form creation. In addition, associating the form material in the candidate material list with the form subject information helps the creator quickly select a proper form material to improve form material obtaining efficiency.

Figure 4A:
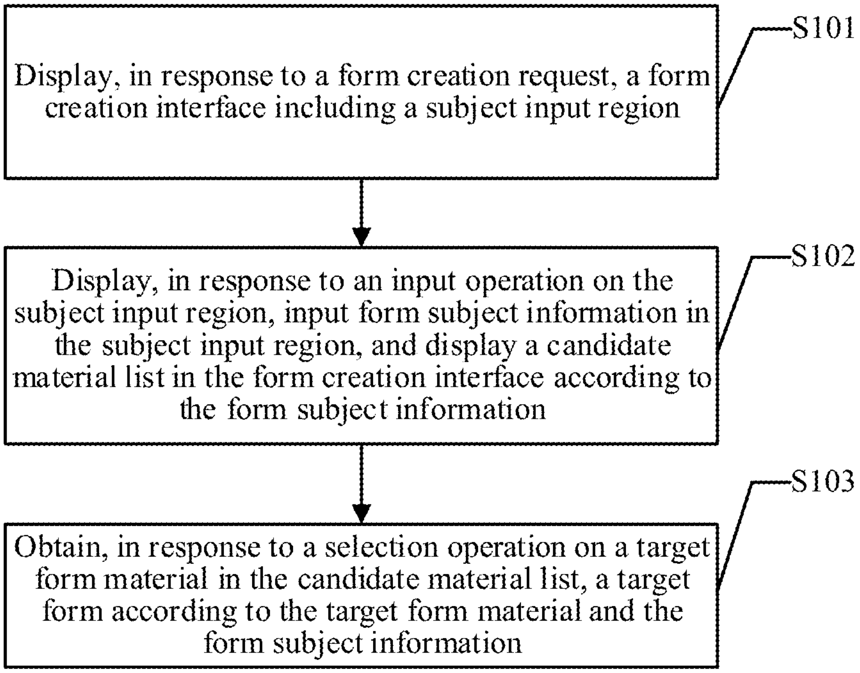
FIG. 4*a* to FIG. 4*l* are schematic flowcharts of a form processing method according to an embodiment of this disclosure.
Figure 4B:
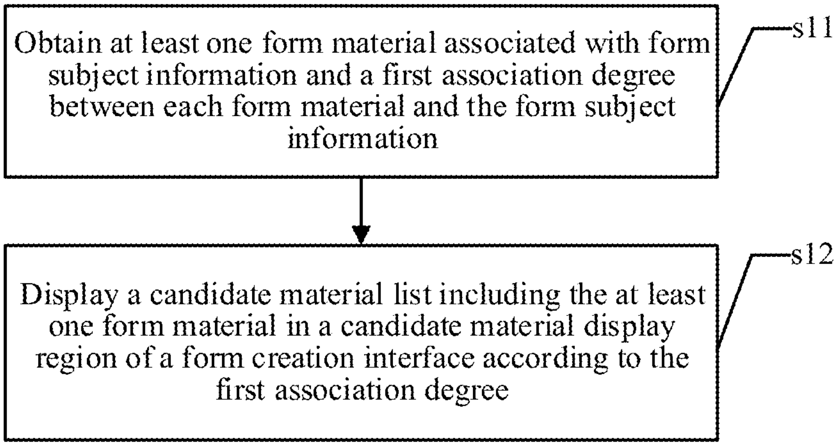

In some embodiments, the computer device may arrange the form material in the candidate material list according to an association degree between the form material and the form subject information. Specifically, as shown in FIG. 4*b*, the following steps s11 to s12 may be included.

In step s11, at least one form material associated with the form subject information and a first association degree between each form material and the form subject information are obtained.

In step s12, the candidate material list including the at least one form material in the candidate material display region of the form creation interface according to the first association degree is displayed.

In steps s11 to s12, the computer device may obtain the at least one form material associated with the form subject information from a historical form and the first association degree between each form material and the form subject information, and arrange the at least one form material in the candidate material list in the candidate material display region of the form creation interface from high to low first association degrees. Arranging the form material in the candidate material list according to the first association degree helps the creator quickly select the proper form material to improve the form material obtaining efficiency, and can reduce operations of browsing, searching, and the like further performed by the user who does not find the proper form material, thereby reducing occupation of a processing resource of the computer device.

In some embodiments, the candidate material list includes a plurality of subject images and a plurality of pieces of question information, and the candidate material display region includes the image display subregion and the question information display subregion. Step s12 may include that: the computer device may arrange the plurality of subject images in the image display subregion from high to low first association degrees respectively corresponding to each of the plurality of subject images, and arrange the plurality of pieces of question information in the question information display subregion from high to low first association degrees respectively corresponding to each of the plurality of pieces of question information. This helps the creator quickly select proper question information and subject image to improve the efficiency of obtaining the form material. It is to be noted that the candidate material list may further include one or more of a question type, a to-be-selected answer, and an answer display mode of the question information. The question type is determined according to whether the to-be-selected answer of the question information is known. When the to-be-selected answer of the question information is known, the question type of the question information is an answer selection type; or when the to-be-selected answer of the question information is unknown, the question type of the question information is a question-answer type. For example, the question information is "Your gender?", and to-be-selected answers of such question information are male and female, that is, the to-be-selected answers of such question information are known, so that a question type of "Your gender?" is the answer selection type. For another example, the question information is "Your name?", and a to-be-selected answer of such question information is unknown, so that a question type of "Your name?" is the question-answer type. In addition, the answer display mode may be determined according to a display mode of question information in the historical form created by the user.

Figure 4C:
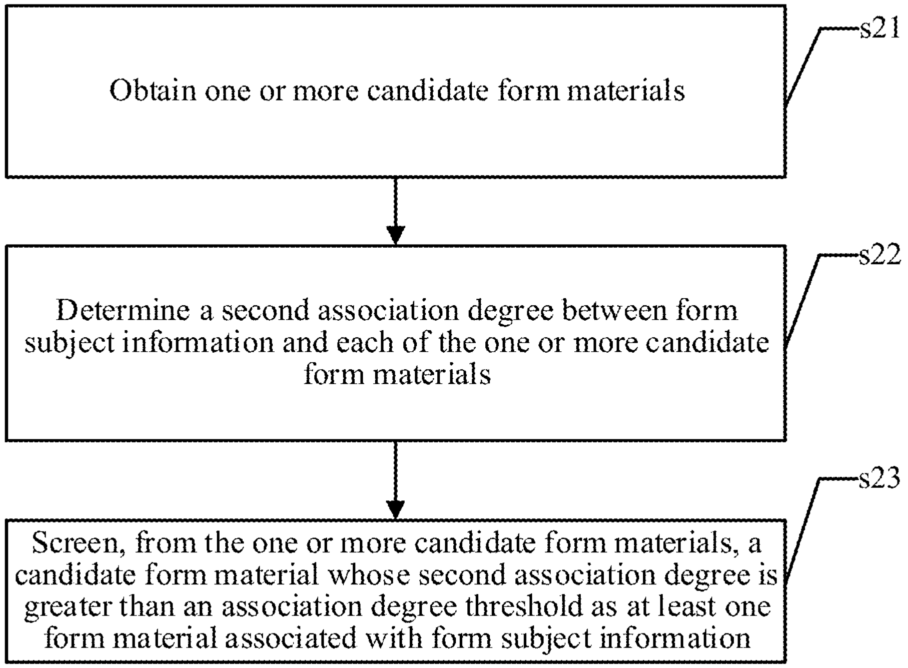

In some embodiments, an implementation of obtaining the at least one form material associated with the form subject information in step s11 may include the following steps s21 to s23, as shown in FIG. 4*c*.

In step s21, one or more candidate form materials are obtained.

In step s22, a second association degree between the form subject information and each of the one or more candidate form materials is determined.

In step s23, from the one or more candidate form materials, a candidate form material whose second association degree is greater than an association degree threshold is screened as the at least one form material associated with the form subject information.

In steps s21 to s23, the computer device may obtain the one or more candidate form materials from the historical form, and determine the second association degree between the form subject information and each of the one or more candidate form materials. A low second association degree indicates a low probability that the corresponding candidate form material is selected by the creator. Conversely, a high second association degree indicates a high probability that the corresponding candidate form material is selected by the creator. Therefore, the candidate form material whose second association degree is greater than the association degree threshold may be screened from the one or more candidate form materials as the form material associated with the form subject information. Screening the candidate form material to obtain the form material associated with the form subject information may reduce a redundancy of the form material in the candidate material list, and helps the creator quickly select the proper form material.

Figure 4D:
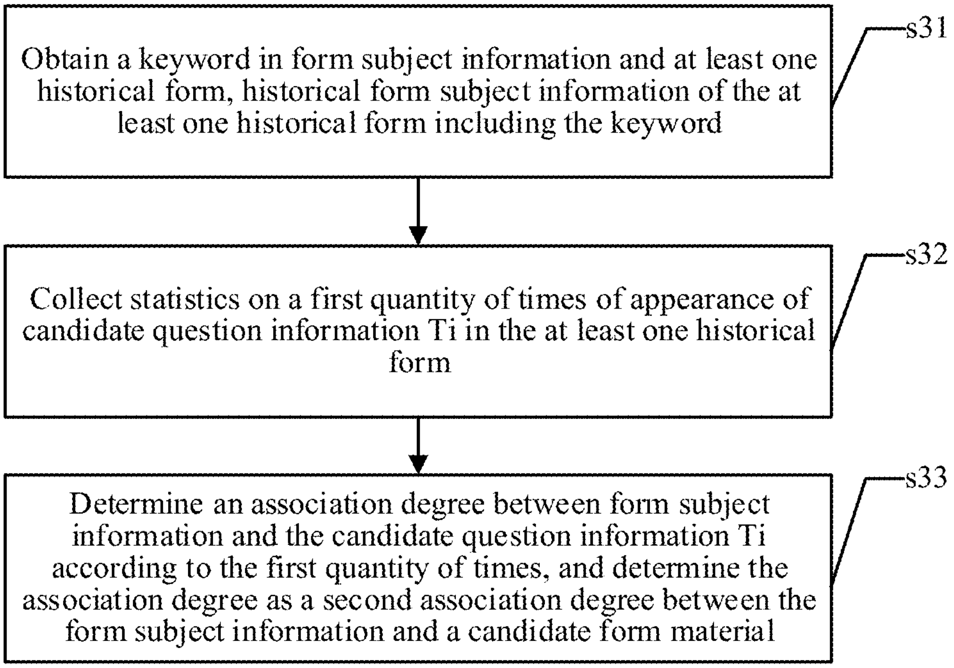

It may be understood that the one or more candidate form materials may include one or more of candidate question information and a subject image. When the one or more candidate form materials include candidate question information Ti, i being an integer greater than or equal to 1, for each piece of candidate question information Ti, an implementation of determining the second association degree between the form subject information and each of the one or more candidate form materials in step s22 includes the following steps s31 to s33, as shown in FIG. 4*d*.

In step s31, a keyword in the form subject information and at least one historical form are obtained, historical form subject information of the at least one historical form includes the keyword.

In step s32, statistics on a first quantity of times of appearance of the candidate question information Ti in the at least one historical form is collected.

In step s33, an association degree between the form subject information and the candidate question information Ti is determined according to the first quantity of times, and the association degree is determined as the second association degree between the form subject information and the candidate form material.

In steps s31 to s33, the computer device may obtain the keyword in the form subject information and a historical form that is created within a preset time period and that includes the keyword. The form subject information includes a representative word. Further, statistics on a total quantity of times of appearance of the candidate question information Ti in all historical forms may be collected as the first quantity of times. A larger first quantity of times indicates a higher probability that the creator selects the candidate question information Ti as a form material. A smaller first quantity of times indicates a lower probability that the creator selects the candidate question information Ti as a form material. Therefore, the second association degree between the form subject information and the candidate question information Ti may be determined according to the first quantity of times. That is, the first quantity of times is in positive correlation with the second association degree. That is, the second association degree increases with increasing of the first quantity of times, and decreases with decreasing of the first quantity of times. Determining the association degree between the form subject information and the candidate question information according to the quantity of times of appearance of the candidate question information in the historical form helps screen question information strongly correlated with the form subject information, and further helps recommend proper question information to the creator to improve question information obtaining efficiency of the creator.

Figure 5:
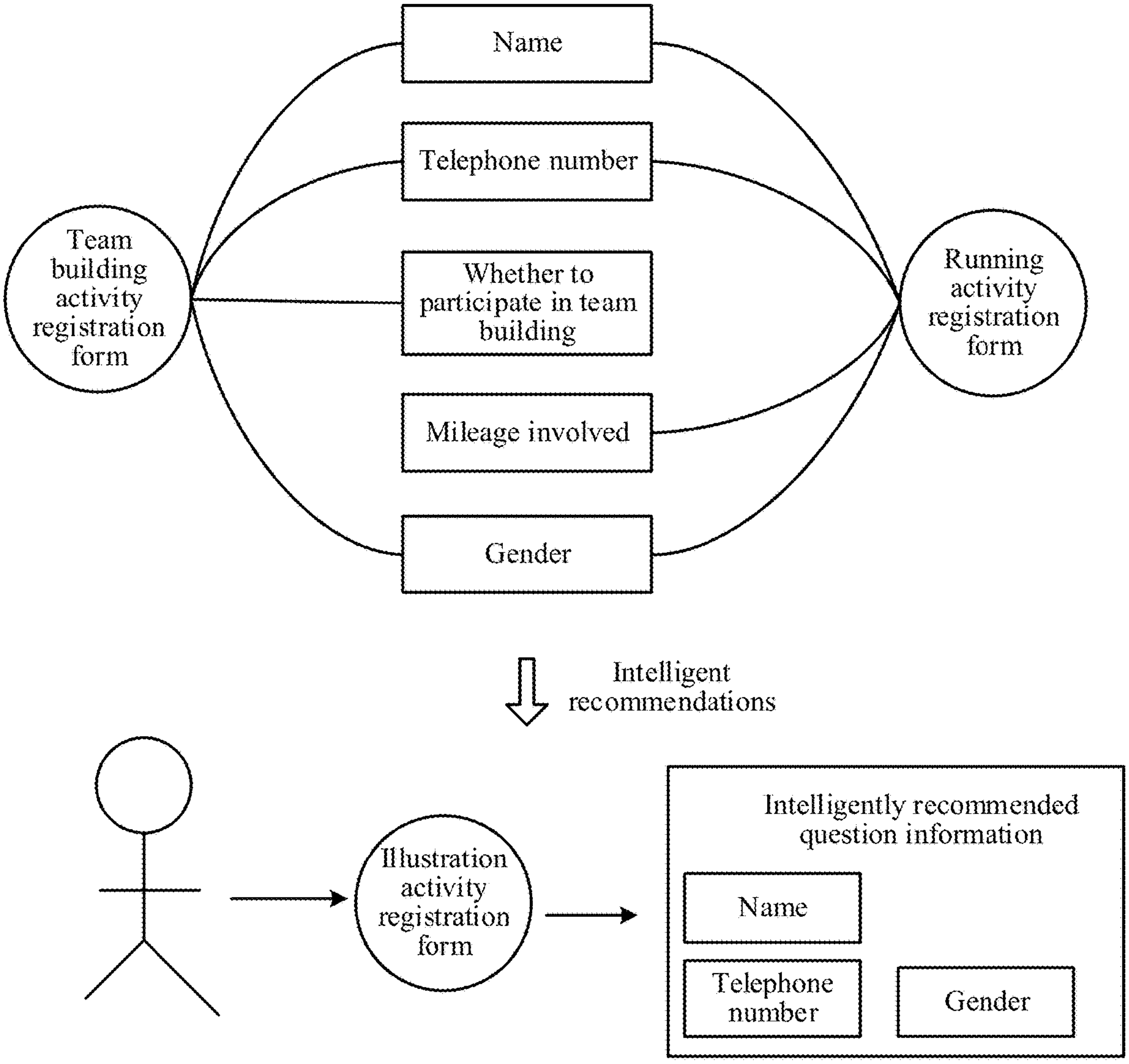
FIG. 5 is a schematic diagram of a scenario in which question information is recommended according to an embodiment of this disclosure.

For example, as shown in FIG. 5, the form subject information is illustration activity registration form. The computer device may extract a keyword in illustration activity registration form. The keyword includes illustration and activity registration. The computer device may obtain a historical form including activity registration in historical form subject information. For example, the historical form includes a team building activity registration form and a running activity registration form. It can be seen from FIG. 5 that both the historical forms include candidate question information about name, telephone number, and gender. That is, quantities of times of appearance of name, telephone number, and gender in the historical forms are all 2. Quantities of times of appearance of mileage involved and whether to participate in team building in the historical forms are both 1. Therefore, the computer device may determine that association degrees between name, telephone number, and gender, and illustration activity registration form are high, and determine name, telephone number, and gender as question information associated with illustration activity registration form.

Figure 4E:
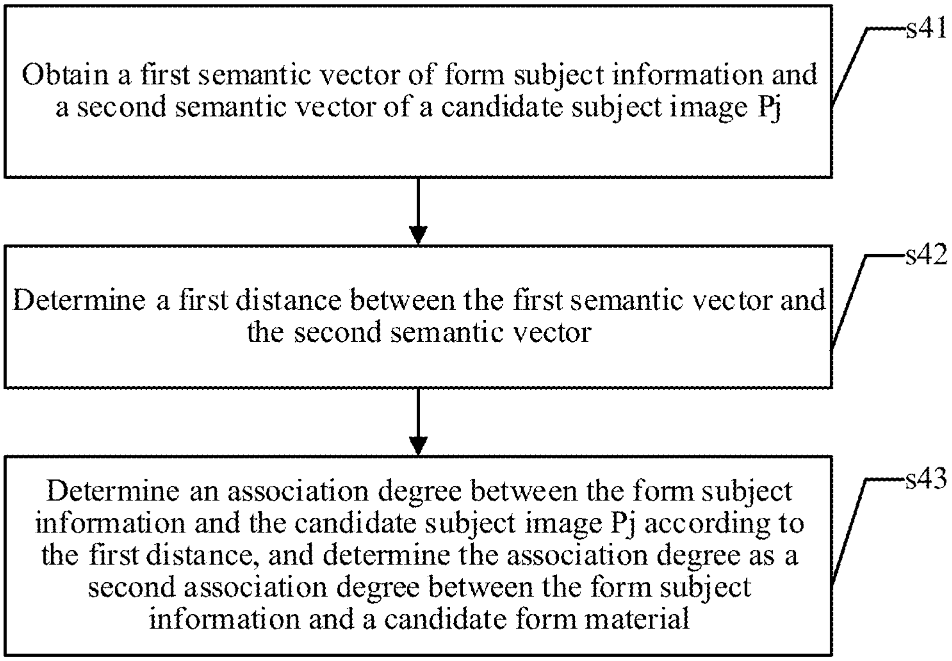

In some embodiments, when the one or more candidate form materials include a candidate subject image Pj, j being an integer greater than or equal to 1, an implementation of determining the second association degree between the form subject information and each of the one or more candidate form materials in step s22 may include the following steps s41 to s43, as shown in FIG. 4*e*.

In step s41, a first semantic vector of the form subject information and a second semantic vector of the candidate subject image Pj are obtained.

In step s42, a first distance between the first semantic vector and the second semantic vector is determined.

In step s43, an association degree between the form subject information and the candidate subject image Pj according to the first distance is determined, and the association degree is determined as the second association degree between the form subject information and the candidate form material.

In steps s41 to s43, the computer device may perform semantic extraction on the form subject information to obtain the first semantic vector of the form subject information, and perform semantic extraction on the candidate subject image Pj to obtain the second semantic vector of the candidate subject image Pj. The first semantic vector and the second semantic vector belong to the same semantic space. The first semantic vector has the same length as the second semantic vector. Further, a distance between the first semantic vector and the second semantic vector may be calculated as the first distance by using a distance algorithm. The distance algorithm may include a Euclidean distance algorithm, a cosine distance algorithm, or the like. A long first distance indicates a great difference between the first semantic vector and the second semantic vector, that is, a great difference between the form subject information and the candidate subject image Pj. A short first distance indicates a small difference between the first semantic vector and the second semantic vector, that is, a small difference between the form subject information and the candidate subject image Pj. Therefore, the computer device may determine a second association degree between the form subject information and the candidate subject image Pj according to the first distance. The first distance is in negative correlation with the second association degree. That is, the second association degree decreases with increasing of the first distance, and increases with decreasing of the first distance. Determining the association degree between the form subject information and the candidate subject image according to the distance between the semantic vector of the form subject information and the semantic vector of the candidate subject image helps screen a subject image strongly correlated with the form subject information, and further helps recommend a proper subject image to the creator to improve subject image obtaining efficiency of the creator.

Figure 4F:
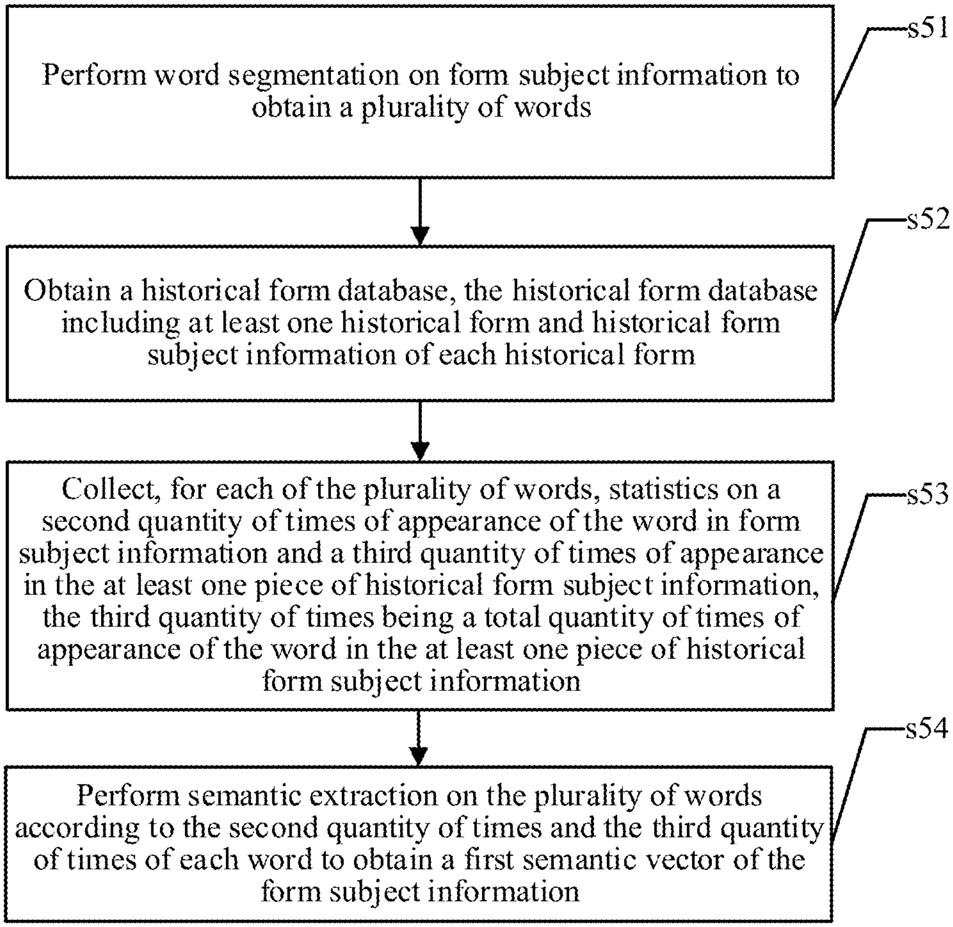

In some embodiments, an implementation of obtaining the first semantic vector of the form subject information in step s41 may include the following steps s51 to s54, as shown in FIG. 4*f*.

In step s51, word segmentation on the form subject information is performed to obtain a plurality of words.

In step s52, a historical form database is obtained, the historical form database includes at least one historical form and historical form subject information of each historical form.

In step s53, for each of the plurality of words, statistics on a second quantity of times of appearance of each word in the form subject information and a third quantity of times of appearance in the at least one piece of historical form subject information are collected, the third quantity of times is a total quantity of times of appearance of the word in the at least one piece of historical form subject information.

In step s54, semantic extraction on the plurality of words is performed according to the second quantity of times and the third quantity of times of each word to obtain the first semantic vector of the form subject information.

In steps s51 to s54, since each word in the form subject information is of different importance, to extract a representative semantic vector in the form subject information to improve a distinction between different form subject information, the computer device may weight the word in the form subject information to obtain the first semantic vector of the form subject information. Specifically, the computer device may perform word segmentation on the form subject information to obtain the plurality of words, and obtain the historical form database, the historical form database including a historical form created within a preset time period (for example, in a recent year or a recent month) and historical form subject information of the historical form. Importance of a word increases with increasing of a frequency of appearance of the word in the current form subject information, and decreases with increasing of a frequency of appearance of the word in the historical form subject information. Therefore, the computer device may collect the statistics on second quantity of times of appearance of each of the plurality of words in the current form subject information and the third quantity of times of appearance in the historical form subject information. Semantic extraction is performed on the plurality of words according to the second quantities of times and the third quantities of times to obtain the first semantic vector of the form subject information. Performing semantic extraction on the plurality of words according to the quantities of times of appearance of the words in the form subject information and the quantities of times of appearance of the words in the historical form subject information to obtain the first semantic vector of the form subject information helps improve representativeness and distinction of the first semantic vector.

Figure 4G:
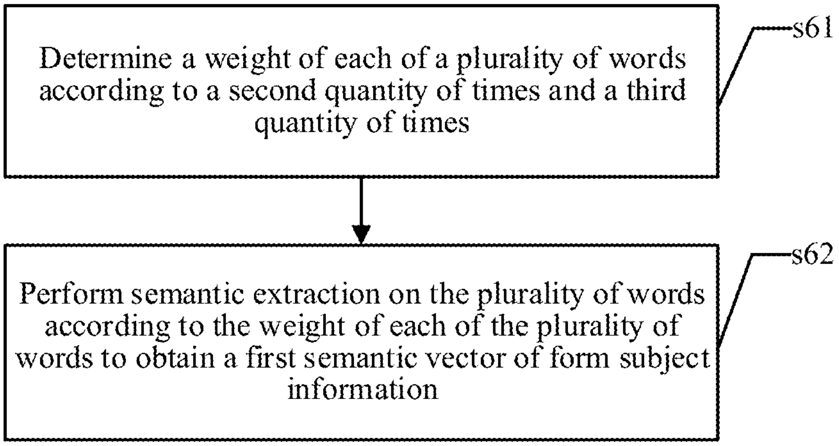

In some embodiments, an implementation of performing semantic extraction on the plurality of words according to the second quantity of times and the third quantity of times of each word to obtain the first semantic vector of the form subject information in step s54 may include the following steps s61 to s62, as shown in FIG. 4*g*.

In step s61, a weight of each of the plurality of words is determined according to the second quantity of times and the third quantity of times.

In step s62, semantic extraction on the plurality of words is performed according to the weight of each of the plurality of words to obtain the first semantic vector of the form subject information.

In steps s61 to s62, the computer device may determine the weight of each of the plurality of words according to the second quantity of times and the third quantity of times. The weight of the word is used for reflecting the importance of the word. That is, a greater weight indicates higher importance of the word. A smaller weight indicates lower importance of the word. Therefore, the computer device may perform semantic extraction on the plurality of words according to the weight of each of the plurality of words to obtain the first semantic vector of the form subject information. For example, the weight of the word may be used as a feature of the word, and the feature of the word is standardized to obtain the first semantic vector of the form subject information. Standardization may refer to converting the weight of the word into a number within a range of [0, 1]. Performing semantic extraction on the words according to the weights of the words to obtain the first semantic vector of the form subject information helps improve the representativeness and distinction of the first semantic vector, and further helps more accurately recommend the subject image associated with the form subject information to the creator.

Figure 4H:
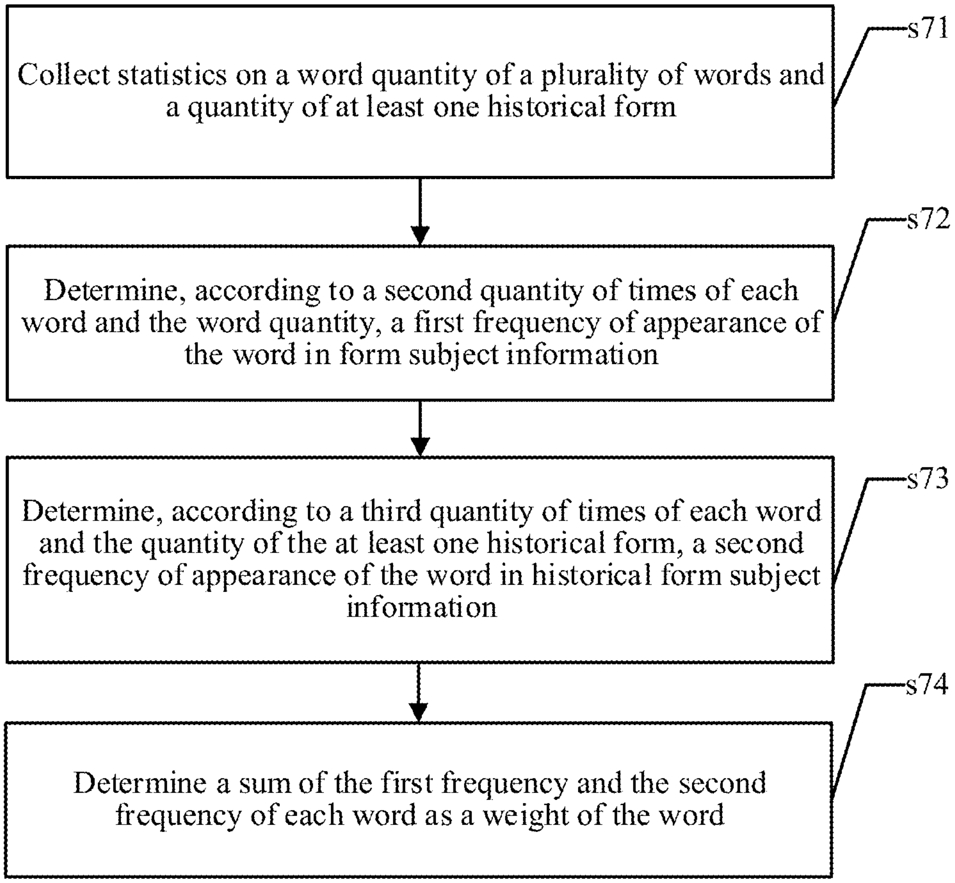

In some embodiments, an implementation of determining the weight of each of the plurality of words according to the second quantity of times and the third quantity of times in step s54 may include the following steps s71 to s74, as shown in FIG. 4*h*.

In step s71, statistics on a word quantity of the plurality of words and a quantity of the at least one historical form are collected.

In step s72, according to the second quantity of times of each word and the word quantity, a first frequency of appearance of the word in the form subject information is determined.

In step s73, according to the third quantity of times of each word and the quantity of the at least one historical form, a second frequency of appearance of the word in the historical form subject information is determined.

In step s74, a sum of the first frequency and the second frequency of each word is determined as the weight of the word.

In steps s71 to s74, since the importance of a word increases with increasing of a frequency of appearance of the word in the current form subject information, and decreases with increasing of a frequency of appearance of the word in the historical form subject information, the computer device may collect the statistics on the word quantity of the plurality of words and the quantity of the at least one historical form in the historical form database. A ratio of the second quantity of times of each word to the word quantity is determined as the first frequency of appearance of the word in the form subject information. A log of a ratio of the third quantity of times of each word and the quantity of the historical form is taken to obtain the second frequency of appearance of the word in the historical form. It can be seen that a larger second quantity of times indicates a higher first frequency corresponding to the word and higher importance of the word. A smaller second quantity of times indicates a lower first frequency corresponding to the word and lower importance of the word. A larger third quantity of times indicates a lower second frequency corresponding to the word and lower importance of the word. A smaller third quantity of times indicates a higher second frequency corresponding to the word and higher importance of the word. Therefore, the sum of the first frequency and the second frequency of each word may be determined as the weight of the word. Determining the weight of the word according to the frequency of appearance of the word in the form subject information and the frequency of appearance of the word in the historical form subject information helps recognize the representative word in the form subject information, and further helps improve the representativeness and distinction of the first semantic vector.

It is to be noted that it is assumed that the form subject information is illustration activity registration form, words of illustration activity registration form include illustration, activity, registration, and form, and the first frequency of appearance of each word in the form subject information is ¼. However, the word “form” in the form subject information is of no actual meaning. To eliminate impact of the meaningless word, the second frequency of each word needs to be further obtained. Specifically, the log of the ratio of the third quantity of times to the form quantity is taken to obtain the second frequency of appearance of each word in the historical form. If the quantity of the historical form is 4, a quantity of times of appearance of the word “form” in the historical form is 4 because the word “form” may appear in each form. Therefore, the second frequency of the word “form” is 0. This can reduce impact of a word that frequently appears in each piece of form subject information but is of no actual meaning for question information recommendation, such as “form”, on question information recommendation.

Figure 4I:
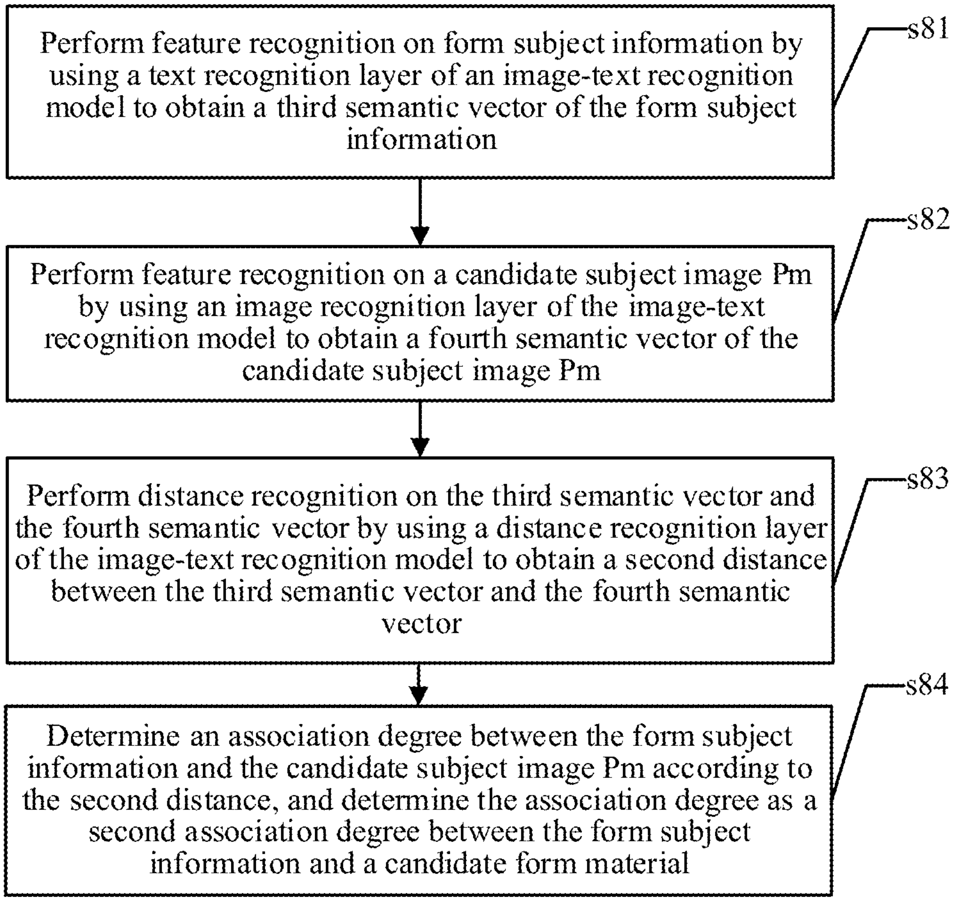

In some embodiments, when the one or more candidate form materials include a candidate subject image Pm, m being an integer greater than or equal to 1, an implementation of determining the second association degree between the form subject information and each of the one or more candidate form materials in step s22 may include the following steps s81 to s84, as shown in FIG. 4*i*.

In step s81, feature recognition is performed on the form subject information by using a text recognition layer of an image-text recognition model to obtain a third semantic vector of the form subject information.

In step s82, feature recognition is performed on the candidate subject image Pm by using an image recognition layer of the image-text recognition model to obtain a fourth semantic vector of the candidate subject image Pm.

In step s83, distance recognition is performed on the third semantic vector and the fourth semantic vector by using a distance recognition layer of the image-text recognition model to obtain a second distance between the third semantic vector and the fourth semantic vector.

In step s84, an association degree between the form subject information and the candidate subject image Pm is determined according to the second distance, and the association degree is determined as the second association degree between the form subject information and the candidate form material.

Figure 6:
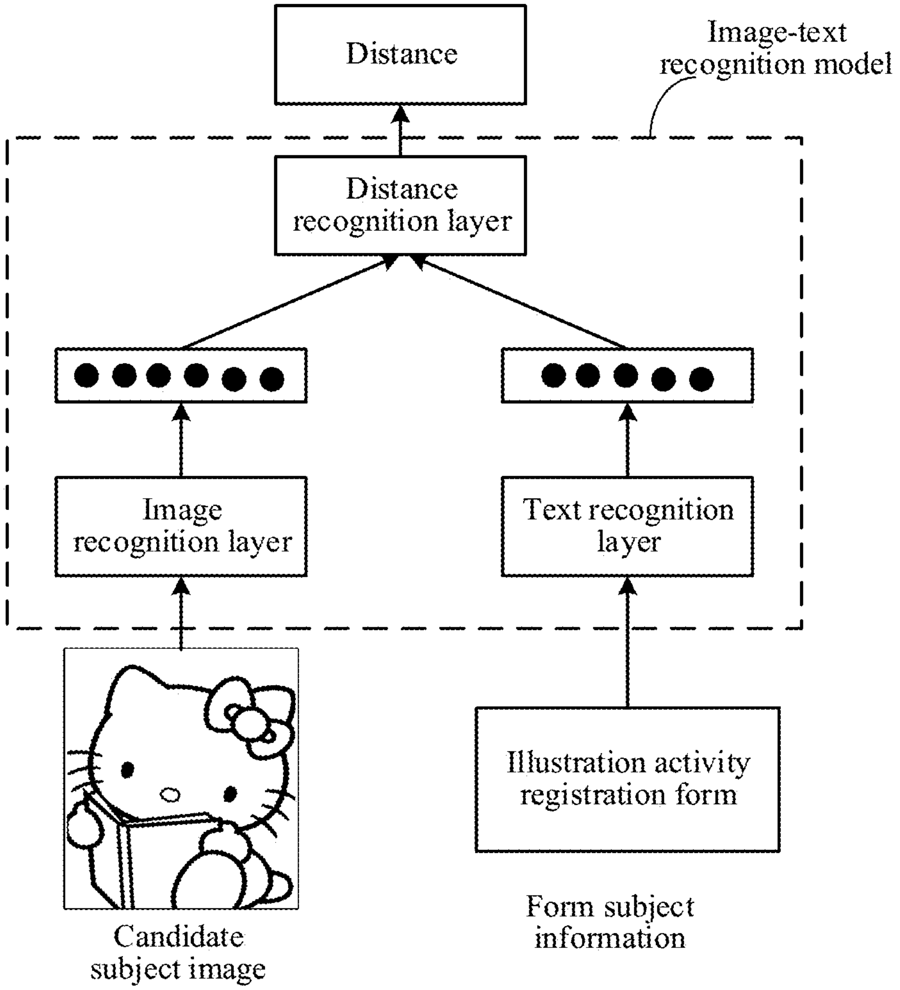
FIG. 6 is a schematic diagram of a scenario in which a distance between form subject information and a candidate subject image is obtained according to an embodiment of this disclosure.

In steps s81 to s84, as shown in FIG. 6, the computer device may include the image-text recognition model. The image-text recognition model is used for recognizing the association degree between the form subject information and the candidate subject image. Specifically, the image-text recognition model includes the text recognition layer, the image recognition layer, and the distance recognition layer. The computer device may perform feature recognition on the form subject information by using the text recognition layer of the image-text recognition model to obtain the third semantic vector of the form subject information. Feature recognition may be performed on the candidate subject image Pm by using the image recognition layer of the image-text recognition model to obtain the fourth semantic vector of the candidate subject image Pm. Further, distance recognition is performed on the third semantic vector and the fourth semantic vector by using the distance recognition layer of the image-text recognition model to obtain the second distance between the third semantic vector and the fourth semantic vector. A long second distance indicates a great difference between the third semantic vector and the fourth semantic vector, that is, a great difference between the form subject information and the candidate subject image Pm. A short second distance indicates a small difference between the third semantic vector and the fourth semantic vector, that is, a small difference between the form subject information and the candidate subject image Pm. Therefore, the computer device may determine the association degree between the form subject information and the candidate subject image Pm according to the second distance as the second association degree between the form subject information and the candidate form material. The second distance is in negative correlation with the second association degree. That is, the second association degree decreases with increasing of the second distance, and increases with decreasing of the second distance. Recognizing the subject image and the form subject information through the image-text recognition model to determine the association degree between the form subject information and the candidate subject image helps screen a subject image strongly correlated with the form subject information, and further helps recommend a proper subject image to the creator to improve subject image obtaining efficiency of the creator.

Figure 7:
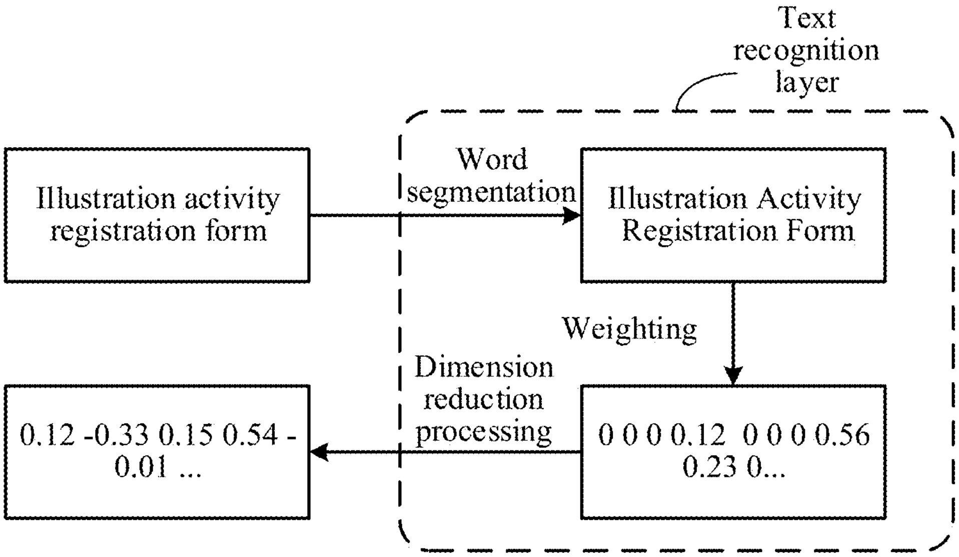
FIG. 7 is a schematic diagram of a scenario in which a semantic vector of form subject information is obtained according to an embodiment of this disclosure.

In some embodiments, as shown in FIG. 7, it is assumed that the form subject information is illustration activity registration form. The text recognition layer performs word segmentation on illustration activity registration form to obtain illustration, activity, registration, and form. Further, the weight of each word may be obtained. Semantic extraction is performed on the plurality of words according to the weight of each word to obtain a candidate semantic vector of the form subject information. Dimension reduction processing is performed on the candidate semantic vector to obtain the third semantic vector of the form subject information. Extracting the semantic vector of the form subject information according to the weight of the word helps improve the distinction and representativeness of the semantic vector of the form subject information. Performing dimension reduction processing on the semantic vector of the form subject information helps save storage space of the computer device and reduce a computational overhead.

Figure 8:
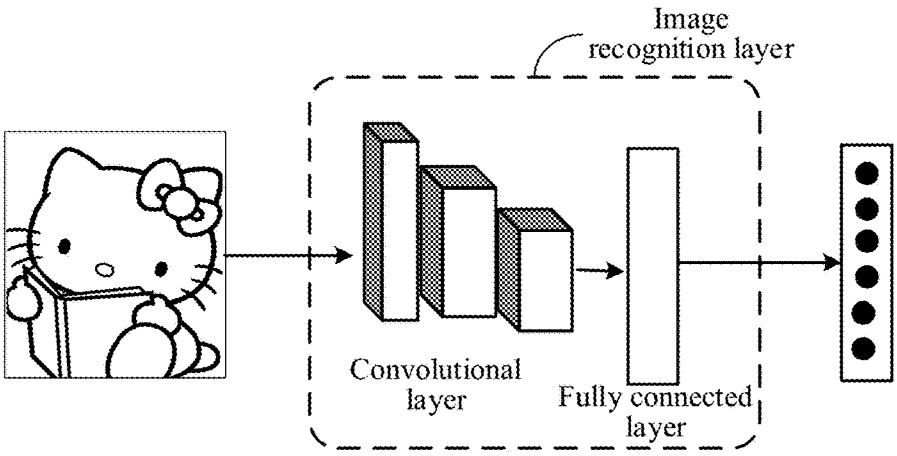
FIG. 8 is a schematic diagram of a scenario in which a semantic vector of a candidate subject image is obtained according to an embodiment of this disclosure.

In some embodiments, as shown in FIG. 8, the image recognition layer may include a convolutional layer and a fully connected layer. The convolutional layer obtains feature information of the candidate subject image. The fully connected layer maps the feature information of the candidate subject image into a one-dimensional semantic vector to obtain the fourth semantic vector of the candidate subject image.

In step S103, in response to a selection operation on a target form material in the candidate material list, a target form is obtained according to the target form material and the form subject information.

The creator may select one or more form materials from the candidate material list. The selected form material may be referred to as a target form material. Accordingly, the computer device may add the target form material to an initial form in response to the selection operation on the target form material in the candidate material list, to obtain the target form including the target form material and the form subject information. The target form may be used for collecting information.

It may be understood that the target form material may include one or more of the subject image and question related information. When the target form material includes the question related information, step S103 may include the following two implementations.

Figure 4J:
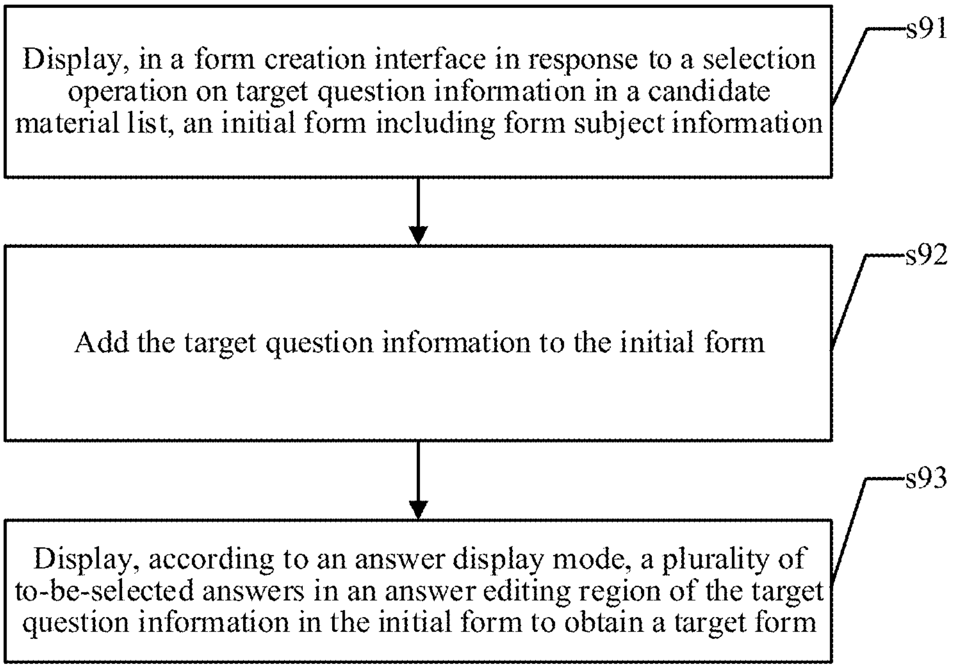

Implementation 1: when the target form material includes the question related information, the question related information includes target question information, a plurality of to-be-selected answers of the target question information, and an answer display mode. That is, the candidate material list includes a question information template, and each question information template includes to-be-selected question information, a plurality of to-be-selected answers of the to-be-selected question information, and an answer display mode. Step S103 may include the following steps s91 to s93, as shown in FIG. 4*j*.

In step s91, in the form creation interface in response to a selection operation on the target question information in the candidate material list, an initial form including the form subject information is displayed.

In step s92, the target question information is added to the initial form.

In step s93, according to the answer display mode, the plurality of to-be-selected answers are displayed in an answer editing region of the target question information in the initial form to obtain the target form.

In steps s91 to s93, the creator may perform a selection operation on any question information template in the candidate material list. That is, the creator performs a selection operation on any piece of question information in the candidate material list, and determines the selected question information as the target question information. Accordingly, the computer device may display, in the form creation interface in response to the selection operation on the target question information in the candidate material list, the initial form including the form subject information, and add the target question information to a question information display region of the initial form. Further, the plurality of to-be-selected answers are displayed in the answer editing region of the target question information in the initial form according to the answer display mode to obtain the target form. It can be seen that the question information in the form, the to-be-selected answer of the question information, and the answer display mode all do not need to be manually edited by the creator, but only need to be selected from the candidate material list. This improves the convenience and efficiency in form creation.

Figure 4K:
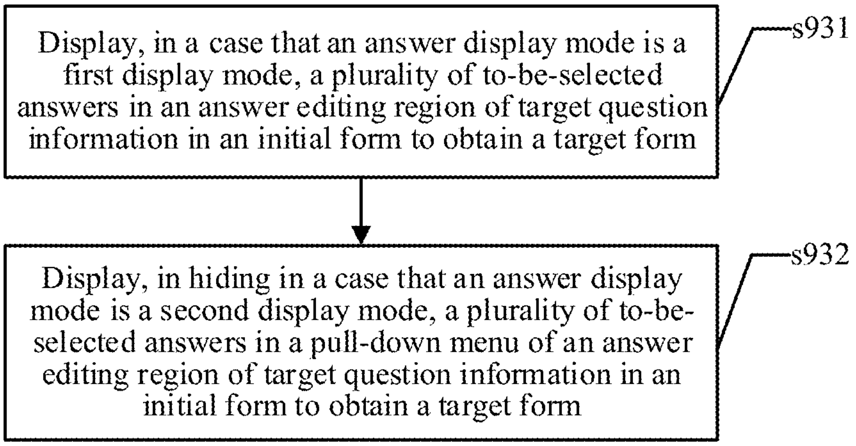

Further, the answer display mode may include a first display mode and a second display mode. The first display mode may be a direct display mode. The second display mode may be a hiding display mode. The computer device may display the plurality of to-be-selected answers of the target question information in the answer editing region according to the answer display mode. Specifically, step s93 may include the following steps s931 to s932, as shown in FIG. 4*k*.

In step s931, in a case that the answer display mode is the first display mode, the plurality of to-be-selected answers are displayed in the answer editing region of the target question information in the initial form to obtain the target form.

In step s932, in a case that the answer display mode is the second display mode, the plurality of to-be-selected answers are displayed in hiding in a pull-down menu of the answer editing region of the target question information in the initial form to obtain the target form.

In steps s931 to s932, if the answer display mode is the first display mode, the plurality of to-be-selected answers may be directly displayed in the answer editing region of the target question information in the initial form to obtain the target form. This helps a completer quickly select a matched answer. If the answer display mode is the second display mode, the plurality of to-be-selected answers are displayed, in hiding, in the pull-down menu to obtain the target form. This helps reduce a length of the form.

Figure 9A:
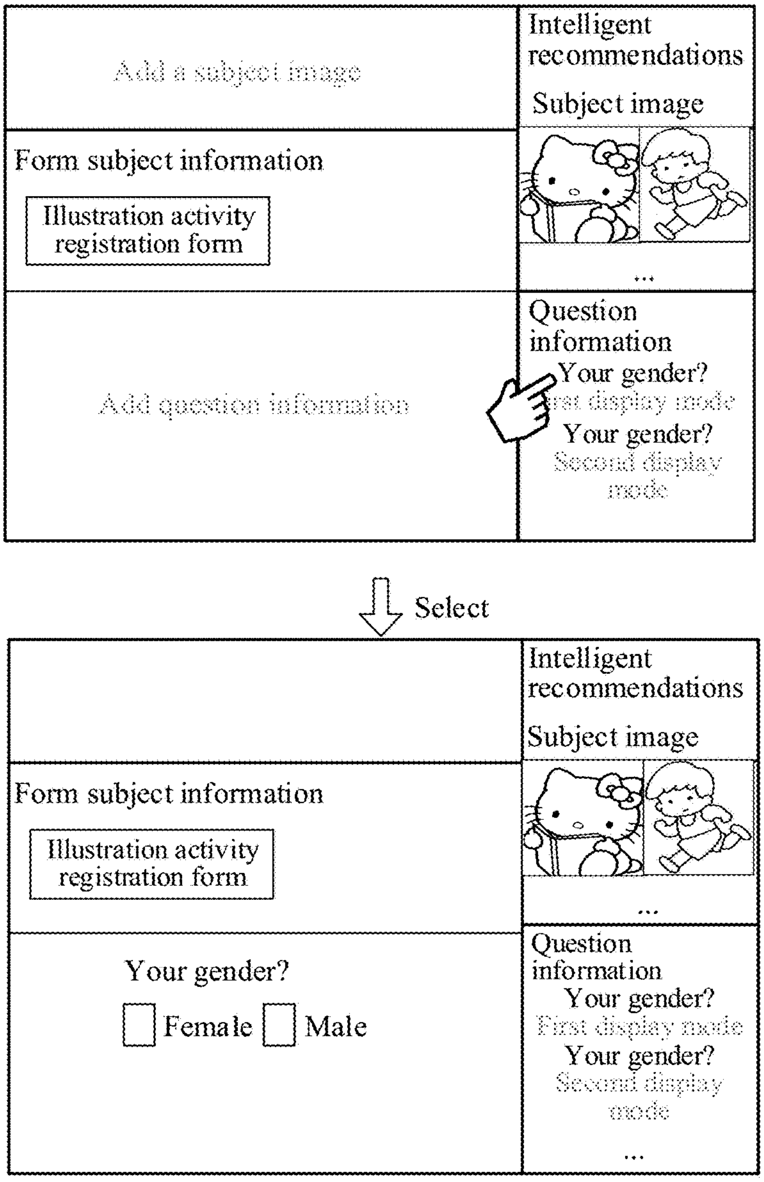
FIG. 9*a* is a schematic diagram of a scenario in which question information is selected according to an embodiment of this disclosure.
Figure 9B:
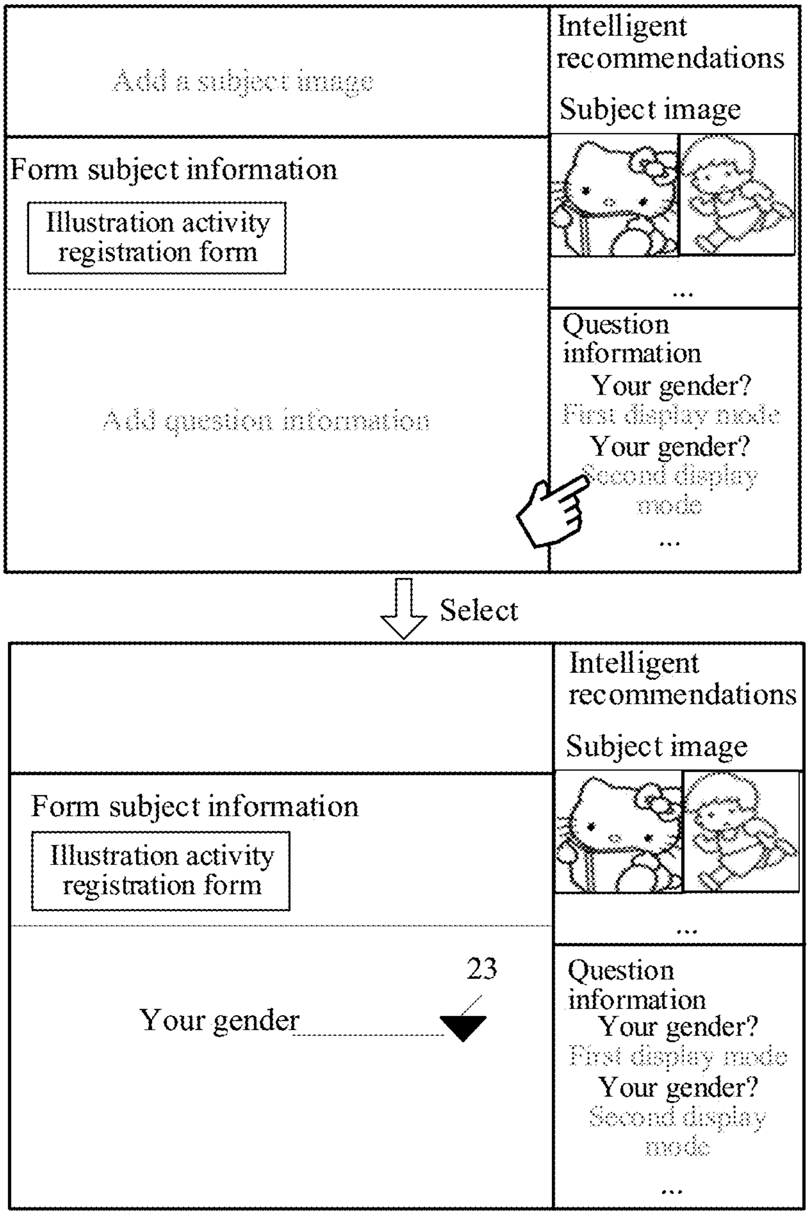
FIG. 9*b* is a schematic diagram of a scenario in which question information is selected according to an embodiment of this disclosure.

For example, as shown in FIG. 9*a* and FIG. 9*b*, the form creation interface includes a form display region and the candidate material display region. The form display region includes the subject input region, a subject image display region, and the question information display region. The subject input region includes the form subject information: illustration activity registration form. The subject image display region includes prompt information “Add a subject image”, which is used for prompting the creator to add the subject image in the subject image region. The question information display region includes prompt information “Add question information”, which is used for prompting the creator to add the question information in the question information display region. The candidate material display region includes the image display subregion and the question information display subregion. The image display subregion includes the subject image associated with the form subject information in the candidate material list. The question information display subregion includes the question information associated with the form subject information in the candidate material list. The question information includes “Your gender”. The question information includes the first display mode and the second display mode. The candidate material may further include to-be-selected answers of the question information: male and female (not shown in FIG. 9*a* and FIG. 9*b*). If the creator selects the question information of the first display mode, as shown in FIG. 9*a*, the computer device may display the question information in the question information display region, and display the candidate answers in an answer editing region of the question information. If the creator selects the second display mode, as shown in FIG. 9*b*, the computer device may display the question information in the question information display region, and display, in hiding, the candidate answers in a pull-down menu 23 of an answer editing region.

Figure 4L:
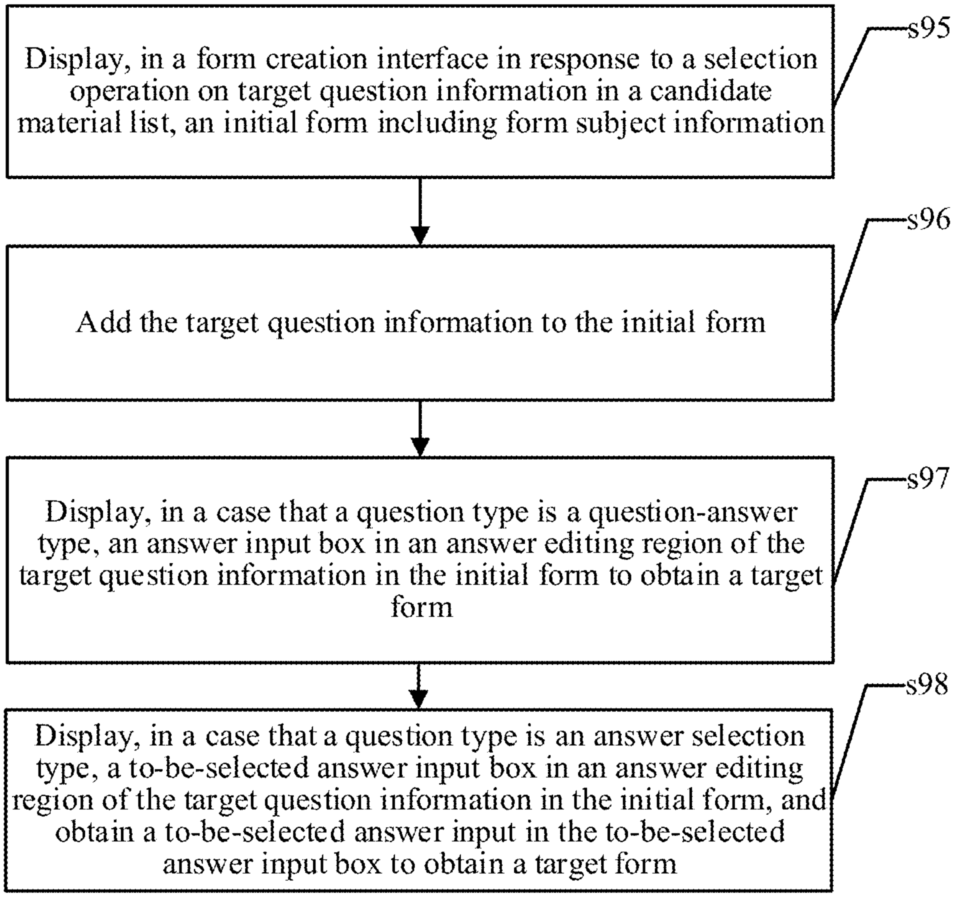

Implementation 2: when the target form material includes the question related information, the question related information includes target question information and a question type of the target question information. Step S103 may include the following steps s95 to s98, as shown in FIG. 4*l*.

In step s95, in response to a selection operation on the target question information in the candidate material list, an initial form including the form subject information is displayed in the form creation interface.

In step s96, the target question information is added to the initial form.

In step s97, in a case that the question type is a question-answer type, an answer input box is displayed in an answer editing region of the target question information in the initial form to obtain the target form.

In step s98, in a case that the question type is an answer selection type, a to-be-selected answer input box is displayed in an answer editing region of the target question information in the initial form, and a to-be-selected answer input in the to-be-selected answer input box is received to obtain the target form.

Figure 10A:
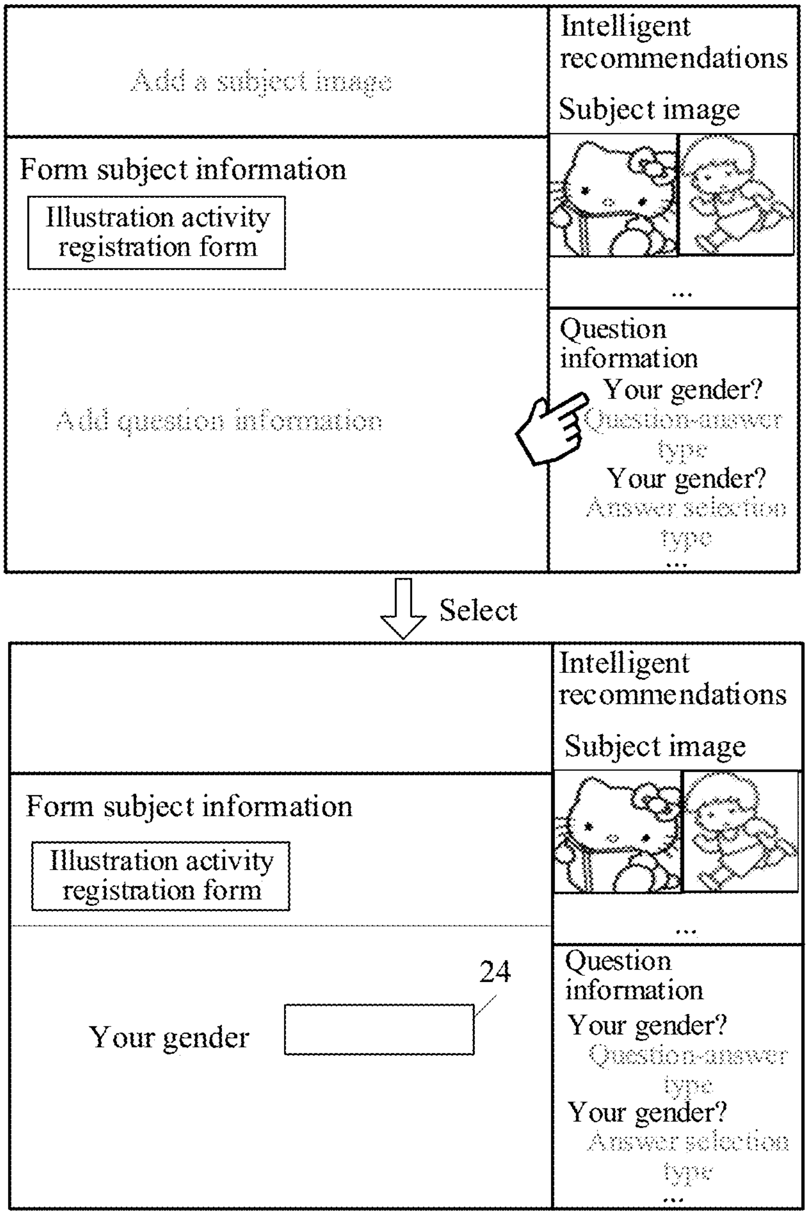
FIG. 10*a* is a schematic diagram of a scenario in which question information is selected according to an embodiment of this disclosure.
Figure 10B:
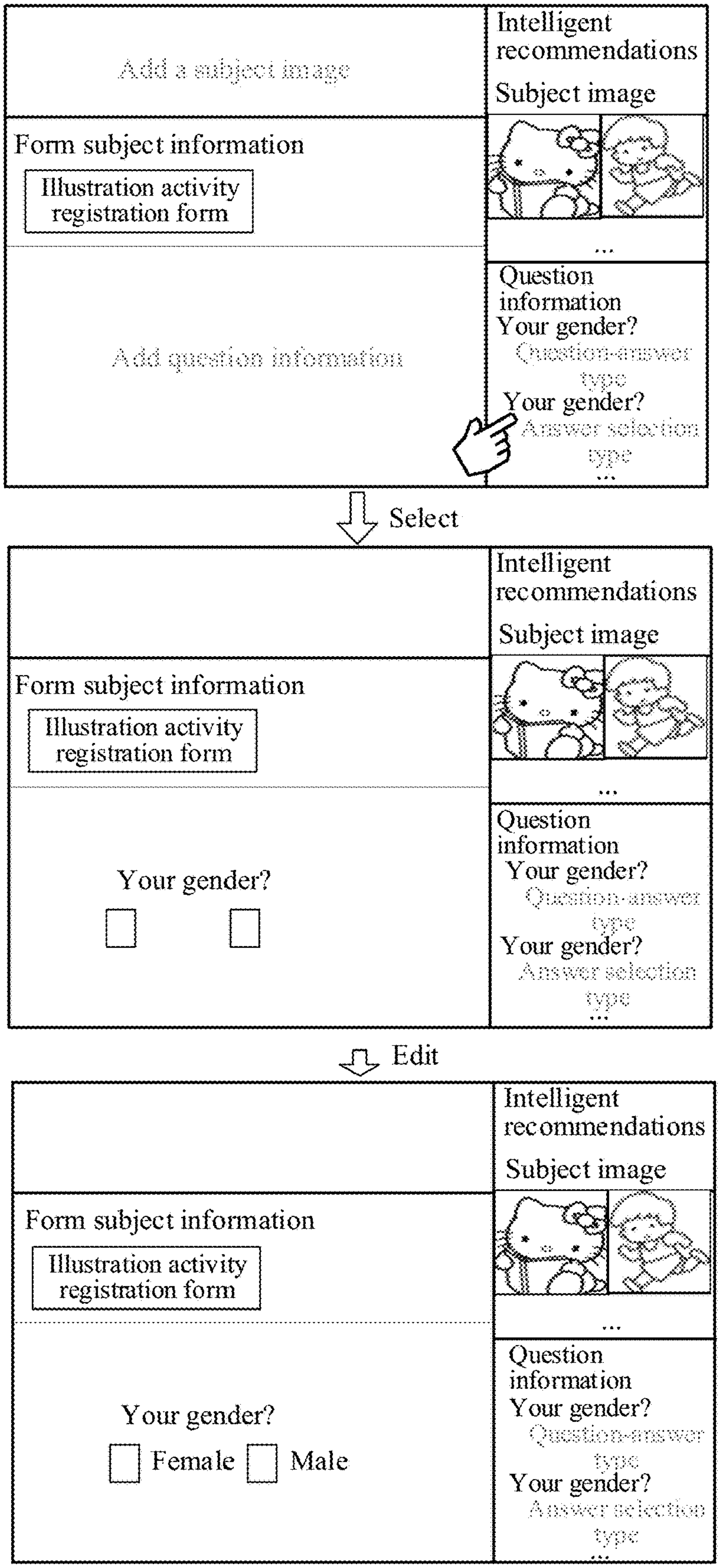
FIG. 10*b* is a schematic diagram of a scenario in which question information is selected according to an embodiment of this disclosure.

In steps s95 to s98, the creator performs a selection operation on any piece of question information in the candidate material list, and determines the selected question information as the target question information. Accordingly, the computer device may display, in the form creation interface in response to the selection operation on the target question information in the candidate material list, the initial form including the form subject information, and add the target question information to a question information display region of the initial form. Further, if the question type is the question-answer type, the question-answer type being a question type that needs an information completer to edit an answer of the target question information, the answer input box may be displayed in the answer editing region of the target question information in the initial form to obtain the target form. The answer input box is used for the information completer to edit the answer of the target question information. If the question type is the answer selection type, the answer selection type being a question type that needs the creator to provide the to-be-selected answer for the information completer, the to-be-selected answer input box may be displayed in the answer editing region of the target question information in the initial form, and the to-be-selected answer input in the to-be-selected answer input box is obtained to obtain the target form. When the question type is the answer selection type, the creator inputs the to-be-selected answer of the question information, so that flexibility and personality in form creation are improved. When the question type is the question-answer type, the information completer edits the answer of the question information, so that diversity and personality of the answer are improved. For example, as shown in FIG. 10*a* and FIG. 10*b*, the candidate question information is “Your gender”, and the question type includes the question-answer type and the answer selection type. If the creator selects the candidate question information of the question-answer type, the computer device may add “Your gender” to the initial form, and display an answer input box 24 in an answer editing region of the candidate question information. If the creator selects the candidate question information of the answer selection type, the computer device may add "Your gender" to the initial form, display a to-be-selected answer input box in an answer editing region of the candidate question information, obtain to-be-selected answers input by the creator: female and male, and display the to-be-selected answers in a to-be-selected answer editing region.

In some embodiments, when the creator selects a plurality of pieces of target question information, the computer device may display the plurality of pieces of target question information in an initial form (e.g., in a list manner) according to selection time or position information of each piece of target question information.

Specifically, when the plurality of pieces of target question information are displayed in the initial form according to the selection time of each piece of target question information, the target form material includes the plurality of pieces of target question information, a plurality of to-be-selected answers of each piece of target question information, and an answer display mode of each piece of target question information. The answer display mode of each piece of target question information may be the same or different. Step S103 may include that: the creator performs a selection operation on plurality of pieces of question information in the candidate material list, and determines the selected question information as the target question information. Accordingly, the computer device may display, in the form creation interface in response to the selection operation on the plurality of pieces of target question information in the candidate material list, the initial form including the form subject information. Further, the plurality of pieces of target question information are arranged in the initial form according to the selection time of each piece of target question information from early to late. Then, the plurality of to-be-selected answers of each piece of target question information are displayed, according to the answer display mode of each piece of target question information, in an answer editing region of the corresponding target question information in the initial form to obtain the target form. Arranging the plurality of pieces of question information in the initial form according to the selection time of each piece of target question information can improve the convenience and efficiency in form creation.

In some embodiments, when the computer device displays the plurality of pieces of target question information in the initial form according to the position information of each piece of target question information, the target form material specifically includes the plurality of pieces of target question information, a plurality of to-be-selected answers of each piece of target question information, and an answer display mode of each piece of target question information. Step S103 may include that: the creator performs a selection operation on plurality of pieces of question information in the candidate material list, and determines the selected question information as the target question information. Accordingly, the computer device may display, in the form creation interface in response to the selection operation on the plurality of pieces of target question information in the candidate material list, the initial form including the form subject information. Further, the plurality of pieces of target question information are arranged in the initial form according to the position information carried by the selection operation. According to the answer display mode of each piece of target question information, a position of each piece of target question information in the initial form being allowed to be dynamically adjusted, the plurality of to-be-selected answers of each piece of target question information are displayed in an answer editing region of the corresponding target question information in the initial form to obtain the target form. Arranging the plurality of pieces of question information in the initial form according to the position information of each piece of target question information can improve the convenience and efficiency in form creation. In some embodiments, when the target form material includes the subject image, step S103 may include: displaying, in response to a selection operation on the target subject image in the candidate material list, an initial form including the form subject information in the form creation interface; and adding the target subject image to an image display region of the initial form to obtain the target form.

The creator performs a selection operation on any subject image in the candidate material list, and determines the selected subject image as a target subject image. Accordingly, the computer device may display, in the form creation interface in response to the selection operation on the target subject image in the candidate material list, the initial form including the form subject information, and add the target subject image to the image display region of the initial form to obtain the target form.

After creating the target form, the computer device may share the target form to another user. The another user herein may be referred to as the information completer. The information completer returns the answer of the question information based on the target form. Specifically, the information completer may return the answer of the question information in the following manner a and manner b.

Manner a: in response to a selection operation on a to-be-selected answer in an answer editing region in the target form, the selected to-be-selected answer is marked as an answer of the target question information in the answer editing region.

When the question type of the target question information is the answer selection type, and the answer display mode is the direct display mode, the information completer may select the answer of the target question information from the to-be-selected answers in the answer editing region. Specifically, when the target question information is of a single-answer type (that is, there is only one answer), the information completer is allowed to select one to-be-selected answer from the answer editing region as the answer of the target question information. When the target question information is of a multiple-answer type (that is, there is more than one answer), the information completer is allowed to select a plurality of to-be-selected answers from the answer editing region as answers of the target question information. Accordingly, the computer device obtains a quantity of selected to-be-selected answers in response to the selection operation on the to-be-selected answers in the answer editing region in the target form, and if the quantity is less than a quantity threshold, marks the selected to-be-selected answer as the answer of the target question information in the answer editing region. The quantity threshold herein may be determined according to the question type of the target question information.

Manner b: the plurality of to-be-selected answers are displayed, in response to a touch operation on a pull-down menu in an answer editing region in the target form, in the pull-down menu; and in response to a selection operation on the plurality of to-be-selected answers in the pull-down menu, a selected to-be-selected answer is marked as an answer of the target question information in the answer editing region.

When the question type of the target question information is the answer selection type, and the answer display mode is the hiding display mode, the information completer may select the answer of the target question information from the pull-down menu of the answer editing region. Specifically, the computer device displays the plurality of to-be-selected answers in the pull-down menu in response to the touch operation on the pull-down menu in the answer editing region in the target form. The information completer may select one or more of the plurality of to-be-selected answers displayed in the pull-down menu as the answer of the target question information. Accordingly, the computer device may mark, in response to the selection operation on the plurality of to-be-selected answers in the pull-down menu, the selected to-be-selected answer as the answer of the target question information in the answer editing region. In some embodiments, when the question type of the target question information is the question-answer type, the information completer may edit the answer of the target question information in an answer input box in the target form. Accordingly, the computer device may determine content obtained by editing as the answer of the target question information in response to an editing operation on the answer input box of the target question information in the target form.

When the creator needs to create a form, the computer device may display, in response to a form creation request, a form creation interface including a subject input region, and may further display form subject information input by the creator in the subject input region, and display a candidate material list a candidate material list in the form creation interface according to the form subject information. The creator may select one or more form materials from the candidate material list. Accordingly, the computer device determines the form material selected by the creator as a target form material. The target form material may be one of a subject image, question information, a subject image as well as question information, or the like. A target form is obtained according to the form subject information and the target form material. It can be seen that in a form creation process, displaying the candidate material list in the form creation interface helps the creator select the form material from the candidate material list to create the form, and avoids manual editing of the form material and frequent jumping from the form creation interface to another interface for obtaining the form material. This improves efficiency and convenience in form creation. In addition, associating the form material in the candidate material list with the form subject information helps the creator quickly select a proper form material to improve form material obtaining efficiency.

Figure 11:
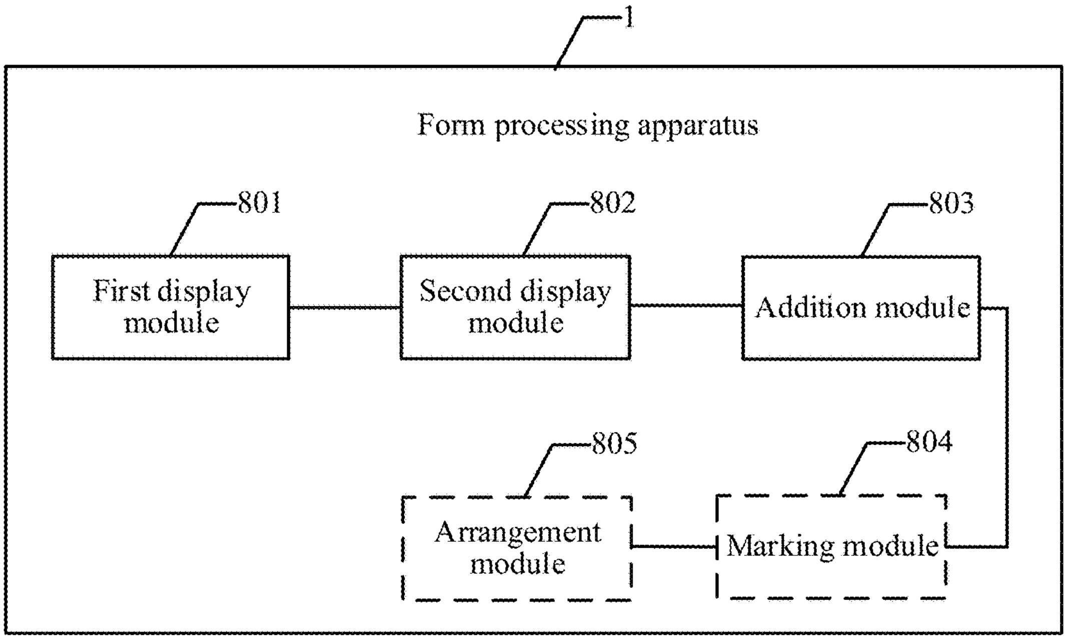
FIG. 11 is a schematic structural diagram of a form processing apparatus according to an embodiment of this disclosure.

Referring to FIG. 11, FIG. 11 is a schematic structural diagram of a form processing apparatus according to an embodiment of this disclosure. The form processing apparatus 1 may be a computer program (including program code) running in a computer device. For example, the form processing apparatus is application software. The apparatus may be configured to perform the corresponding steps in the method provided in the embodiments of this disclosure. As shown in FIG. 11, the form processing apparatus 1 may include a first display module 801, a second display module 802, and an addition module 803. One or more modules, submodules, and/or units of the apparatus can be implemented by processing circuitry, software, or a combination thereof, for example.

The first display module 801 is configured to display, in response to a form creation request, a form creation interface including a subject input region.

The second display module 802 is configured to display, in response to an input operation on the subject input region, input form subject information in the subject input region, and display a candidate material list in the form creation interface according to the form subject information, a form material in the candidate material list being associated with the form subject information.

The addition module 803 is configured to create, in response to a selection operation on a target form material in the candidate material list, a target form according to the target form material and the form subject information.

In some embodiments, the target form material includes target question information, a plurality of to-be-selected answers of the target question information, and an answer display mode.

That the addition module 803 obtains, in response to a selection operation on a target form material in the candidate material list, a target form according to the target form material and the form subject information includes:

- displaying, in the form creation interface in response to a selection operation on the target question information in the candidate material list, an initial form including the form subject information;
- adding the target question information to the initial form; and
- displaying, according to the answer display mode, the plurality of to-be-selected answers in an answer editing region of the target question information in the initial form to obtain the target form.

In some embodiments, that the addition module 803 displays, according to the answer display mode, the plurality of to-be-selected answers in an answer editing region of the target question information in the initial form to obtain the target form includes:

- displaying, in a case that the answer display mode is a first display mode, the plurality of to-be-selected answers in the answer editing region of the target question information in the initial form to obtain the target form; or
- displaying, in hiding in a case that the answer display mode is a second display mode, the plurality of to-be-selected answers in a pull-down menu of the answer editing region of the target question information in the initial form.

In some embodiments, the target form material includes target question information and a question type of the target question information.

That the addition module 803 obtains, in response to a selection operation on a target form material in the candidate material list, a target form according to the target form material and the form subject information includes:

- displaying, in the form creation interface in response to a selection operation on the target question information in the candidate material list, an initial form including the form subject information;
- adding the target question information to the initial form; and
- displaying, in a case that the question type is a question-answer type, an answer input box in an answer editing region of the target question information in the initial form to obtain the target form, or
- displaying, in a case that the question type is an answer selection type, a to-be-selected answer input box in an answer editing region of the target question information in the initial form, and obtaining a to-be-selected answer input in the to-be-selected answer input box to obtain the target form.

In some embodiments, the target form material includes a plurality of pieces of target question information, a plurality of to-be-selected answers of each piece of target question information, and an answer display mode of each piece of target question information.

That the addition module 803 obtains, in response to a selection operation on a target form material in the candidate material list, a target form according to the target form material and the form subject information includes:

displaying, in response to a selection operation on the plurality of pieces of target question information in the candidate material list, an initial form including the form subject information in the form creation interface;

arranging the plurality of pieces of target question information in the initial form according to selection time carried by the selection operation, the selection time being corresponding time when each of the plurality of pieces of target question information is selected; and displaying, according to the answer display mode of each piece of target question information, the plurality of to-be-selected answers of each piece of target question information in an answer editing region of the corresponding target question information in the initial form to obtain the target form.

In some embodiments, the target form material includes a plurality of pieces of target question information, a plurality of to-be-selected answers of each piece of target question information, and an answer display mode of each piece of target question information.

That the addition module 803 obtains, in response to a selection operation on a target form material in the candidate material list, a target form according to the target form material and the form subject information includes:

displaying, in response to a selection operation on the plurality of pieces of target question information in the candidate material list, an initial form including the form subject information in the form creation interface;

arranging the plurality of pieces of target question information in the initial form according to position information carried by the selection operation, the position information being display position information of each of the plurality of pieces of target question information; and displaying, according to the answer display mode of each piece of target question information, the plurality of to-be-selected answers of each piece of target question information in an answer editing region of the corresponding target question information in the initial form to obtain the target form.

In some embodiments, the target form material includes a target subject image. That the addition module 803 obtains a target form according to the target form material and the form subject information includes:

displaying, in response to a selection operation on the target subject image in the candidate material list, an initial form including the form subject information in the form creation interface; and adding the target subject image to an image display region of the initial form to obtain the target form.

In some embodiments, the apparatus further includes:

a marking module 804, configured to mark, in response to a selection operation on a to-be-selected answer in an answer editing region in the target form, the selected to-be-selected answer as an answer of the target question information in the answer editing region.

The marking module 804 is further configured to display, in response to a touch operation on a pull-down menu in an answer editing region in the target form, the plurality of to-be-selected answers in the pull-down menu, and mark, in response to a selection operation on the plurality of to-be-selected answers in the pull-down menu, a selected to-be-selected answer as an answer of the target question information in the answer editing region.

In some embodiments, the apparatus further includes:

an arrangement module 805, configured to obtain at least one form material associated with the form subject information and a first association degree between each form material and the form subject information, and display the candidate material list including the at least one form material in a candidate material display region of the form creation interface according to the first association degree.

In some embodiments, the candidate material list includes a plurality of subject images and a plurality of pieces of question information. The candidate material display region includes an image display subregion and a question information display subregion.

That the arrangement module 805 displays the candidate material list including the at least one form material in a candidate material display region of the form creation interface according to the first association degree includes:

arranging the plurality of subject images in the image display subregion according to a first association degree corresponding to each of the plurality of subject images; and arranging the plurality of pieces of question information in the question information display subregion according to a first association degree corresponding to each of the plurality of pieces of question information.

In some embodiments, that the arrangement module 805 obtains at least one form material associated with the form subject information includes:

obtaining one or more candidate form materials;

determining, for each of the one or more candidate form materials, a second association degree between the form subject information and the candidate form material; and screening, from the one or more candidate form materials, a candidate form material whose second association degree is greater than an association degree threshold as the at least one form material associated with the form subject information.

In some embodiments, the one or more candidate form materials include candidate question information Ti, i being an integer greater than or equal to 1.

That the arrangement module 805 determines, for each of the one or more candidate form materials, a second association degree between the form subject information and the candidate form material includes:

for the candidate question information Ti, obtaining a keyword in the form subject information and at least one historical form, historical form subject information of the at least one historical form including the keyword;

collecting statistics on a first quantity of times of appearance of the candidate question information Ti in the at least one historical form, the first quantity of times being a total quantity of times of appearance of the candidate question information Ti in the at least one historical form; and determining an association degree between the form subject information and the candidate question information Ti according to the first quantity of times, and determining the association degree as the second association degree between the form subject information and the candidate form material.

In some embodiments, the one or more candidate form materials include a candidate subject image Pj, j being an integer greater than or equal to 1.

That the arrangement module 805 determines, for each of the one or more candidate form materials, a second association degree between the form subject information and the candidate form material includes:

for the candidate subject image Pj, obtaining a first semantic vector of the form subject information and a second semantic vector of the candidate subject image Pj;

determining a first distance between the first semantic vector and the second semantic vector; and determining an association degree between the form subject information and the candidate subject image Pj according to the first distance, and determining the association degree as the second association degree between the form subject information and the candidate form material.

In some embodiments, that the arrangement module 805 obtains a first semantic vector of the form subject information includes:

performing word segmentation on the form subject information to obtain a plurality of words;

obtaining a historical form database, the historical form database including at least one historical form and historical form subject information of each historical form;

collecting, for each of the plurality of words, statistics on a second quantity of times of appearance of the word in the form subject information and a third quantity of times of appearance in the at least one piece of historical form subject information, the third quantity of times being a total quantity of times of appearance of the word in the at least one historical form subject information; and performing semantic extraction on the plurality of words according to the second quantity of times and the third quantity of times of each word to obtain the first semantic vector of the form subject information.

In some embodiments, that the arrangement module 805 performs semantic extraction on the plurality of words according to the second quantity of times and the third quantity of times to obtain the first semantic vector of the form subject information includes:

determining a weight of each of the plurality of words according to the second quantity of times and the third quantity of times; and performing semantic extraction on the plurality of words according to the weight of each of the plurality of words to obtain the first semantic vector of the form subject information.

In some embodiments, that the arrangement module 805 determines a weight of each of the plurality of words according to the second quantity of times and the third quantity of times includes:

collecting statistics on a word quantity of the plurality of words and a quantity of the at least one historical form in the historical form database;

determining, according to the second quantity of times of each word and the word quantity, a first frequency of appearance of the word in the form subject information;

determining, according to the third quantity of times of each word and the quantity of the at least one historical form, a second frequency of appearance of the word in the historical form subject information; and determining a sum of the first frequency and the second frequency of each word as the weight of the word.

In some embodiments, the one or more candidate form materials include a candidate subject image Pm, m being an integer greater than or equal to 1.

That the arrangement module 805 determines, for each of the one or more candidate form materials, a second association degree between the form subject information and the candidate form material includes:

for the candidate subject image Pm, performing feature recognition on the form subject information by using a text recognition layer of an image-text recognition model to obtain a third semantic vector of the form subject information;

performing feature recognition on the candidate subject image Pm by using an image recognition layer of the image-text recognition model to obtain a fourth semantic vector of the candidate subject image Pm;

performing distance recognition on the third semantic vector and the fourth semantic vector by using a distance recognition layer of the image-text recognition model to obtain a second distance between the third semantic vector and the fourth semantic vector; and determining an association degree between the form subject information and the candidate subject image Pm according to the second distance, and determining the association degree as the second association degree between the form subject information and the candidate form material.

According to an embodiment of this disclosure, the steps involved in the form processing method shown in FIG. 4 may be performed by each module in the form processing apparatus shown in FIG. 11. For example, step S101 shown in FIG. 4 may be performed by the first display module 801 in FIG. 11, step S102 shown in FIG. 4 may be performed by the second display module 802 in FIG. 11, and step S103 shown in FIG. 4 may be performed by the addition module 803 in FIG. 11.

According to an embodiment of this disclosure, each module in the form processing apparatus shown in FIG. 11 may exist respectively or be combined into one or more units. Alternatively, a certain (or some) unit in the units may be further split into multiple smaller function subunits, thereby implementing the same operations without affecting the technical effects of the embodiments of this disclosure. The modules are divided based on logical functions. In actual applications, a function of one module may be realized by multiple units, or functions of multiple modules may be realized by one unit. In another embodiment of this disclosure, the form processing apparatus may further include other units. In actual applications, these functions may also be realized cooperatively by the other units, and may be realized cooperatively by multiple units.

According to an embodiment of this disclosure, a computer program (including a program code) capable of performing each step involved in the corresponding method shown in FIG. 4 may be run in a general-purpose computer device, for example, a computer, including a processing element and a storage element, for example, a central processing unit (CPU), a random access memory (RAM), or a read-only memory (ROM), to structure the form processing apparatus shown in FIG. 11 and implement the form processing method in the embodiments of this disclosure. The computer program may be recorded in, for example, a computer-readable recording medium and loaded, through the computer-readable recording medium, and run in the computing device.

In this disclosure, when the creator needs to create a form, the computer device may display, in response to a form creation request, a form creation interface including a subject input region, and may further display form subject information input by the creator in the subject input region, and display a candidate material list a candidate material list in the form creation interface according to the form subject information. The creator may select one or more form materials from the candidate material list. Accordingly, the computer device determines the form material selected by the creator as a target form material. The target form material may be one of a subject image, question information, a subject image as well as question information, or the like. A target form is obtained according to the form subject information and the target form material. It can be seen that in a form creation process, displaying the candidate material list in the form creation interface helps the creator select the form material from the candidate material list to create the form, and avoids manual editing of the form material and frequent jumping from the form creation interface to another interface for obtaining the form material. This improves efficiency and convenience in form creation. In addition, associating the form material in the candidate material list with the form subject information helps the creator quickly select a proper form material to improve form material obtaining efficiency.

Figure 12:
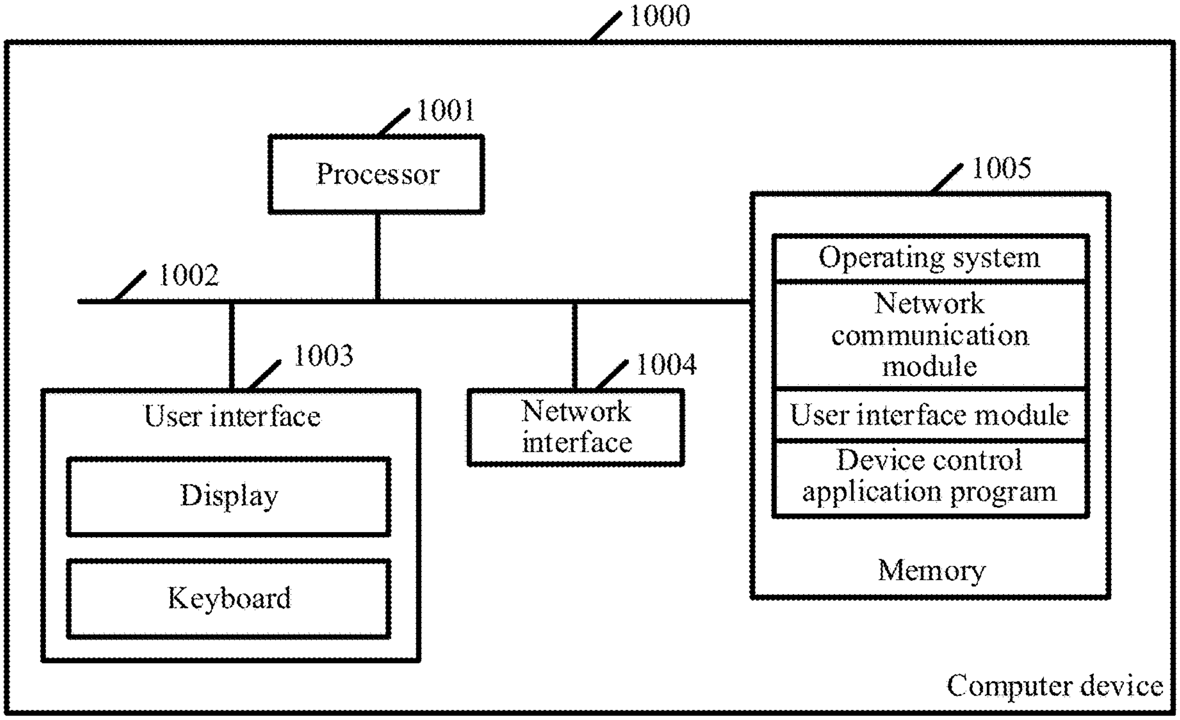
FIG. 12 is a schematic structural diagram of a computer device according to an embodiment of this disclosure.

Referring to FIG. 12, FIG. 12 is a schematic structural diagram of a computer device according to an embodiment of this disclosure. As shown in FIG. 12, the computer device 1000 may include a processor 1001, a network interface 1004, and a memory 1005. In addition, the computer device 1000 may further include a user interface 1003 and at least one communication bus 1002. The communication bus 1002 is configured to implement connection communication between these components. The user interface 1003 may include a display and a keyboard. In some examples, the user interface 1003 may further include a standard wired interface and wireless interface. The network interface 1004 may include a standard wired interface and a standard wireless interface (such as a wireless fidelity (Wi-Fi) interface). The memory 1005 may be a high-speed RAM, or may be a non-volatile memory, for example, at least one disk memory. Alternatively, the memory 1005 may be at least one storage apparatus far away from the processor 1001. As shown in FIG. 12, as a computer-readable storage medium, the memory 1005 may include an operating system, a network communication module, a user interface module, and a device control application program.

In the computer device 1000 shown in FIG. 12, the network interface 1004 may provide a network communication function. The user interface 1003 is mainly configured to provide an input interface for a user. The processor 1001 may be configured to invoke the device control application program stored in the memory 1005 to implement the form processing method in each embodiment.

In this disclosure, when the creator needs to create a form, the computer device may display, in response to a form creation request, a form creation interface including a subject input region, and may further display form subject information input by the creator in the subject input region, and display a candidate material list a candidate material list in the form creation interface according to the form subject information. The creator may select one or more form materials from the candidate material list. Accordingly, the computer device determines the form material selected by the creator as a target form material. The target form material may be one of a subject image, question information, a subject image as well as question information, or the like. A target form is obtained according to the form subject information and the target form material. It can be seen that in a form creation process, displaying the candidate material list in the form creation interface helps the creator select the form material from the candidate material list to create the form, and avoids manual editing of the form material and frequent jumping from the form creation interface to another interface for obtaining the form material. This improves efficiency and convenience in form creation. In addition, associating the form material in the candidate material list with the form subject information helps the creator quickly select a proper form material to improve form material obtaining efficiency.

It is to be understood that the computer device 1000 described in this embodiment of this disclosure may execute the descriptions about the form processing method in the embodiment corresponding to FIG. 4, or may execute the descriptions about the form processing apparatus in the embodiment corresponding to FIG. 11. Elaborations are omitted herein. In addition, the description of beneficial effects of the same method are not described herein again.

Further, an embodiment of this disclosure also provides a computer-readable storage medium. The computer-readable storage medium stores a computer program executed by the form processing apparatus mentioned above. The computer program includes program instructions. The processor, when executing the program instructions, may execute the descriptions about the form processing method in the embodiment corresponding to FIG. 4. Therefore, elaborations are omitted herein. In addition, the description of beneficial effects of the same method are not described herein again. Technical details that are not disclosed in the embodiment of the computer-readable storage medium involved in this disclosure refer to the descriptions in the method embodiments of this disclosure.

As an example, the program instruction may be deployed in a computer device for execution, or deployed in multiple computer devices at the same place for execution, or executed in multiple computer devices interconnected through a communication network at multiple places. The multiple computer device interconnected through the communication network at multiple places may form a blockchain network.

An embodiment of this disclosure also provides a computer program product. The computer program product includes computer instructions. The computer instructions are stored in a computer-readable storage medium (e.g., non-transitory computer-readable storage medium). The computer instructions are executed to implement the form processing method.

It is noted that the term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

It may be understood by a person of ordinary skill in the art that all or some processes in the method of the foregoing embodiments may be completed by a computer program by instructing related hardware. The program may be stored in a computer-readable storage medium. When the program is executed, the processes of each method embodiment may be included. The storage medium may be a magnetic disk, an optical disk, a ROM, a RAM, or the like.

The above is only the preferred embodiment of this disclosure and certainly not intended to limit the scope of this disclosure. Therefore, equivalent variations made according to the claims of this disclosure also fall within the scope of this disclosure.

What is claimed is:

1. A method of form processing, comprising:

displaying, by processing circuitry and in response to a form creation request to generate a questionnaire form to collect information, a form creation interface including a subject input region;

displaying, in response to an input operation on the subject input region, form subject information that is input in the subject input region;

obtaining a candidate material list including one or more form materials, wherein:

the form subject information is segmented into a plurality of words, first association degrees between candidate form materials and the form subject information are calculated based on the candidate form materials and the plurality of words; and the one or more form materials with corresponding first association degrees higher than a threshold are selected from the candidate form materials and added into the candidate material list;

displaying the candidate material list with one or more form materials in the form creation interface according to the form subject information, the one or more form materials in the candidate material list being associated with the form subject information; and obtaining, by the processing circuitry and in response to one or more selection operations on one or more target form materials in the candidate material list, a target form without changing to a different interface from the form creation interface.

2. The method according to claim 1, wherein the displaying the candidate material list comprises:

obtaining the one or more form materials and corresponding first association degrees of the one or more form materials; and displaying the one or more form materials in a candidate material display region of the form creation interface according to a sorting order of the corresponding first association degrees.

3. The method according to claim 2, wherein the candidate material list includes a plurality of subject images and a plurality of questions, the plurality of subject images have a first plurality of the first association degrees with the form subject information, the plurality of questions have a second plurality of the first association degrees with the form subject information, the candidate material display region includes an image display subregion and a question display subregion, and the displaying the candidate material list comprises:

arranging the plurality of subject images in the image display subregion according to the first plurality of the first association degrees; and arranging the plurality of questions in the question information display subregion according to the second plurality of the first association degrees.

4. The method according to claim 2, wherein the obtaining the one or more form materials comprises:

obtaining candidate form materials;

determining, respective second association degrees for the candidate form materials and the form subject information; and screening, from the candidate form materials, the one or more form materials whose second association degrees are greater than an association degree threshold.

5. The method according to claim 4, wherein the determining, the respective second association degrees comprises:

for a candidate question in the candidate form materials, obtaining a keyword in the form subject information and at least one historical form, historical form subject information of the at least one historical form including the keyword;

collecting a first number of times that the candidate question appears in the at least one historical form; and determining a second association degree between the form subject information and the candidate question according to the first number of times.

6. The method according to claim 4, wherein the determining, the respective second association degrees comprises:

for a candidate subject image in the candidate form materials, obtaining a first semantic vector based on the form subject information and a second semantic vector based on the candidate subject image;

determining a first distance between the first semantic vector and the second semantic vector; and determining a second association degree between the form subject information and the candidate subject image according to the first distance.

7. The method according to claim 6, wherein the obtaining the first semantic vector of the form subject information comprises:

performing a word segmentation on the form subject information to obtain a plurality of words;

obtaining a historical form database, the historical form database including at least one historical form and historical form subject information of each historical form;

collecting, for each word of the plurality of words, a second number of times that the word appears in the form subject information and a third number of times that the word appears in the historical form subject information of the at least one historical form; and determining the first semantic vector of the form subject information based on the second number of times and the third number of times of each word of the plurality of words.

8. The method according to claim 7, wherein the determining the first semantic vector comprises:

determining a weight of each word of the plurality of words according to the second number of times and the third number of times; and performing a semantic extraction on the plurality of words according to the weight of each word of the plurality of words to obtain the first semantic vector of the form subject information.

9. The method according to claim 8, wherein the determining the weight of each word of the plurality of words comprises:

collecting statistics on a number of words in the plurality of words and a number of forms in the at least one historical form;

determining, according to the second number of times of each word and the number of words, a first frequency of appearance of the word in the form subject information;

determining, according to the third number of times of the word and the number of forms, a second frequency of appearance of the word in the historical form subject information; and determining a sum of the first frequency and the second frequency of the word as the weight of the word.

10. The method according to claim 4, wherein the determining, the respective second association degrees comprises:

for a candidate subject image in the candidate form materials, performing feature recognition on the form subject information by using a text recognition layer of an image-text recognition model to obtain a third semantic vector of the form subject information;

performing feature recognition on the candidate subject image by using an image recognition layer of the image-text recognition model to obtain a fourth semantic vector of the candidate subject image;

performing distance recognition on the third semantic vector and the fourth semantic vector by using a distance recognition layer of the image-text recognition model to obtain a second distance between the third semantic vector and the fourth semantic vector; and determining a second association degree between the form subject information and the candidate subject image according to the second distance.

11. The method according to claim 1, wherein the one or more target form materials include a target question with a plurality of to-be-selected answers of the target question, and an answer display mode of the target question, and the obtaining the target form comprises:

displaying, in the form creation interface in response to a selection operation on the target question in the candidate material list, an initial form for the form subject information;

adding the target question to the initial form; and displaying, according to the answer display mode, the plurality of to-be-selected answers in an answer editing region for the target question in the initial form to obtain the target form.

12. The method according to claim 11, wherein the displaying the plurality of to-be-selected answers comprises:

displaying with visibility, in response to the answer display mode being a first display mode, the plurality of to-be-selected answers in the answer editing region for the target question in the initial form to obtain the target form; and marking, in response to a selection operation on a to-be-selected answer of the plurality of to-be-selected answers in the answer editing region in the target form, the to-be-selected answer as an answer of the target question in the answer editing region.

13. The method according to claim 11, wherein the displaying the plurality of to-be-selected answers comprises:

displaying with hidden visibility, in response to the answer display mode being a second display mode, the plurality of to-be-selected answers in a pull-down menu of the answer editing region for the target question in the initial form to obtain the target form; and marking, in response to a selection operation on a to-be-selected answer of the plurality of to-be-selected answers in the answer editing region in the target form, the to-be-selected answer as an answer of the target question in the answer editing region.

14. The method according to claim 1, wherein the one or more target form materials include a target question with a question type of the target question, and the obtaining the target form comprises:

displaying, in the form creation interface and in response to a selection operation on the target question in the candidate material list, an initial form for the form subject information;

adding the target question to the initial form; and displaying, in response to the question type being a question-answer type, an answer input box in an answer editing region of the target question in the initial form to obtain the target form; and/or displaying, in response to the question type being an answer selection type, a to-be-selected answer input box in an answer editing region of the target question in the initial form, and obtaining a to-be-selected answer input in the to-be-selected answer input box to obtain the target form.

15. The method according to claim 1, wherein the one or more target form materials include a plurality of target questions, a plurality of to-be-selected answers of each question in the plurality of target questions, and an answer display mode of each question in the plurality of target questions, and the obtaining the target form comprises:

displaying, in response to selection operations respectively on the plurality of target questions in the candidate material list, an initial form for the form subject information in the form creation interface;

arranging the plurality of target questions in the initial form according to respective selection time of the selection operations; and displaying, for each target question, according to the answer display mode of the target question, the plurality of to-be-selected answers of the target question in an answer editing region of the target question in the initial form to obtain the target form.

16. The method according to claim 1, wherein the one or more target form materials include a plurality of target questions, a plurality of to-be-selected answers of each target question in the plurality of target questions, and an answer display mode of each target question in the plurality of target questions, and the obtaining a target form comprises:

displaying, in response to selection operations on the plurality of target questions in the candidate material list, an initial form for the form subject information in the form creation interface;

arranging the plurality of target questions in the initial form according to respective position information associated with the selection operations, position information associated with a selection operation of a target question being used as display position information of the target question in the initial form; and displaying, for each target question, according to the answer display mode of the target question, the plurality of to-be-selected answers of the target question in an answer editing region of the target question in the initial form to obtain the target form.

17. The method according to claim 1, wherein the one or more target form materials include a target subject image, and the obtaining the target form comprises:

displaying, in response to a selection operation on the target subject image in the candidate material list, an initial form for the form subject information in the form creation interface; and adding the target subject image to an image display region of the initial form to obtain the target form.

18. An apparatus for form processing, comprising processing circuitry configured to:

display, in response to a form creation request to generate a questionnaire form to collect information, a form creation interface including a subject input region;

display, in response to an input operation on the subject input region, form subject information that is input in the subject input region;

obtain a candidate material list including one or more form materials, wherein:

the form subject information is segmented into a plurality of words, first association degrees between candidate form materials and the form subject information are calculated based on the candidate form materials and the plurality of words; and the one or more form materials with corresponding first association degrees higher than a threshold are selected from the candidate form materials and added into the candidate material list;

display the candidate material list with one or more form materials in the form creation interface according to the form subject information, the one or more form materials in the candidate material list being associated with the form subject information; and obtain, in response to one or more selection operations on one or more target form materials in the candidate material list, a target form without changing to a different interface from the form creation interface.

19. The apparatus according to claim 18, wherein the processing circuitry is configured to:

obtain the one or more form materials and corresponding first association degrees of the one or more form materials; and display the one or more form materials in a candidate material display region of the form creation interface according to a sorting order of the corresponding first association degrees.

20. The apparatus according to claim 19, wherein the candidate material list comprises a plurality of subject images and a plurality of questions, the plurality of subject images have a first plurality of the first association degrees with the form subject information, the plurality of questions have a second plurality of the first association degrees with the form subject information, the candidate material display region comprises an image display subregion and a question display subregion, and the processing circuitry is configured to:

arrange the plurality of subject images in the image display subregion according to the first plurality of the first association degrees; and arrange the plurality of questions in the question information display subregion according to the second plurality of the first association degrees.

* * * * *